(12) United States Patent
Vuppala et al.

(10) Patent No.: US 12,568,068 B2
(45) Date of Patent: Mar. 3, 2026

(54) METHOD AND APPARATUS FOR DYNAMIC DATA ENCRYPTION IN A COMMUNICATION SYSTEM WITH FORWARD SECRECY

(71) Applicant: Samsung Electronics Co., Ltd., Suwon-si (KR)

(72) Inventors: Ramesh Chandra Vuppala, Bangalore (IN); Dixit Kumar, Bangalore (IN); Donghyun Je, Suwon-si (KR); Neha Sharma, Bangalore (IN); Anshuman Nigam, Bangalore (IN); Dongmyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 18/583,284

(22) Filed: Feb. 21, 2024

(65) Prior Publication Data

US 2024/0283780 A1 Aug. 22, 2024

(30) Foreign Application Priority Data

Feb. 22, 2023 (IN) .............................. 202341012160
Dec. 15, 2023 (IN) ........................... 2023 41012160

(51) Int. Cl.
*H04L 9/40* (2022.01)
*H04L 9/08* (2006.01)
(Continued)

(52) U.S. Cl.
CPC .......... *H04L 63/0428* (2013.01); *H04L 9/085* (2013.01); *H04L 9/14* (2013.01); *H04L 9/3073* (2013.01)

(58) Field of Classification Search
None
See application file for complete search history.

(56) References Cited

U.S. PATENT DOCUMENTS 5,230,020 A * 7/1993 Hardy ....................... H04L 9/14
                                        713/162
5,864,667 A * 1/1999 Barkan ................... H04L 9/083
                                        380/30

(Continued)

FOREIGN PATENT DOCUMENTS

WO        2008/005162 A1      1/2008
WO        2016/163796 A1     10/2016

OTHER PUBLICATIONS

3GPP TR 33.969 V12.0.0, 3rd Generation Partnership Project; Technical Specification on Group Services and System Aspects; Study on Security Aspects of Public Warning System (PWS), Release 12 (2014) (Year: 2014).*

(Continued)

*Primary Examiner* — Kaveh Abrishamkar
(74) *Attorney, Agent, or Firm* — Jefferson IP Law, LLP

(57) ABSTRACT

The disclosure relates to a 5G or 6G communication system for supporting a higher data transmission rate. A method performed by a terminal for dynamic data encryption in a communication system is provided. The method includes receiving, from a network entity, a list of network public keys including a plurality of network public keys and corresponding key indexes, generating a pair of keys including a user equipment (UE) public key and a UE private key in response to receiving the list of network public keys, randomly selecting a network public key from the list of network public keys received from the network entity, generating a shared secret key corresponding to the UE by using the randomly selected network public key and the UE private key, and encrypting data to be transferred between the UE and the network entity by using the generated shared secret key corresponding to the UE.

18 Claims, 23 Drawing Sheets

(51) Int. Cl.
　　　*H04L 9/14*　　　　　(2006.01)
　　　*H04L 9/30*　　　　　(2006.01)

(56)　　　　　　References Cited

U.S. PATENT DOCUMENTS

| | | | | |
|---|---|---|---|---|
| 6,925,182 B1 * | 8/2005 | Epstein | ................. | H04L 9/0866 |
| | | | | 380/282 |
| 8,412,157 B2 * | 4/2013 | Wang | .................... | H04L 9/0833 |
| | | | | 380/278 |
| 2005/0144463 A1 * | 6/2005 | Rossebo | ............ | H04L 63/0815 |
| | | | | 713/185 |
| 2015/0003615 A1 * | 1/2015 | Vanstone | ............. | H04L 9/0847 |
| | | | | 380/282 |
| 2016/0302061 A1 * | 10/2016 | Park | ...................... | H04L 9/0866 |
| 2018/0199205 A1 | 7/2018 | Zhu et al. | | |
| 2020/0084028 A1 * | 3/2020 | Wang | .................. | H04W 12/037 |
| 2020/0371777 A1 * | 11/2020 | Zhang | .................... | G06F 8/654 |

OTHER PUBLICATIONS

ZTE, Discussion on visited network control of using null-scheme, S3-180542, 3GPP TSG SA WG3 (Security) Meeting #90, San Diego, CA, USA, Feb. 18, 2018.

ZTE, Visited network control of null-scheme, S3-180543, 3GPP TSG SA WG3 (Security) Meeting #90Bis, San Diego, CA, USA, Feb. 18, 2018.

International Search Report and Written Opinion dated May 23, 2024, issued in International Patent Application No. PCT/KR2024/002181.

3GPP TS 31.102 V17.8.0, 3rd Generation Partnership Project; Technical Specification Group Core Network and Terminals; Characteristics of the Universal Subscriber Identity Module (USIM) application, (Release 17), Jan. 6, 2023.

3GPP TS 24.501 V18.1.0, Group Core Network and Terminals; Non-Access-Stratum (NAS) protocol for 5G System (5GS); Stage 3; (Release 18), Dec. 15, 2022.

* cited by examiner

FIG. 1A

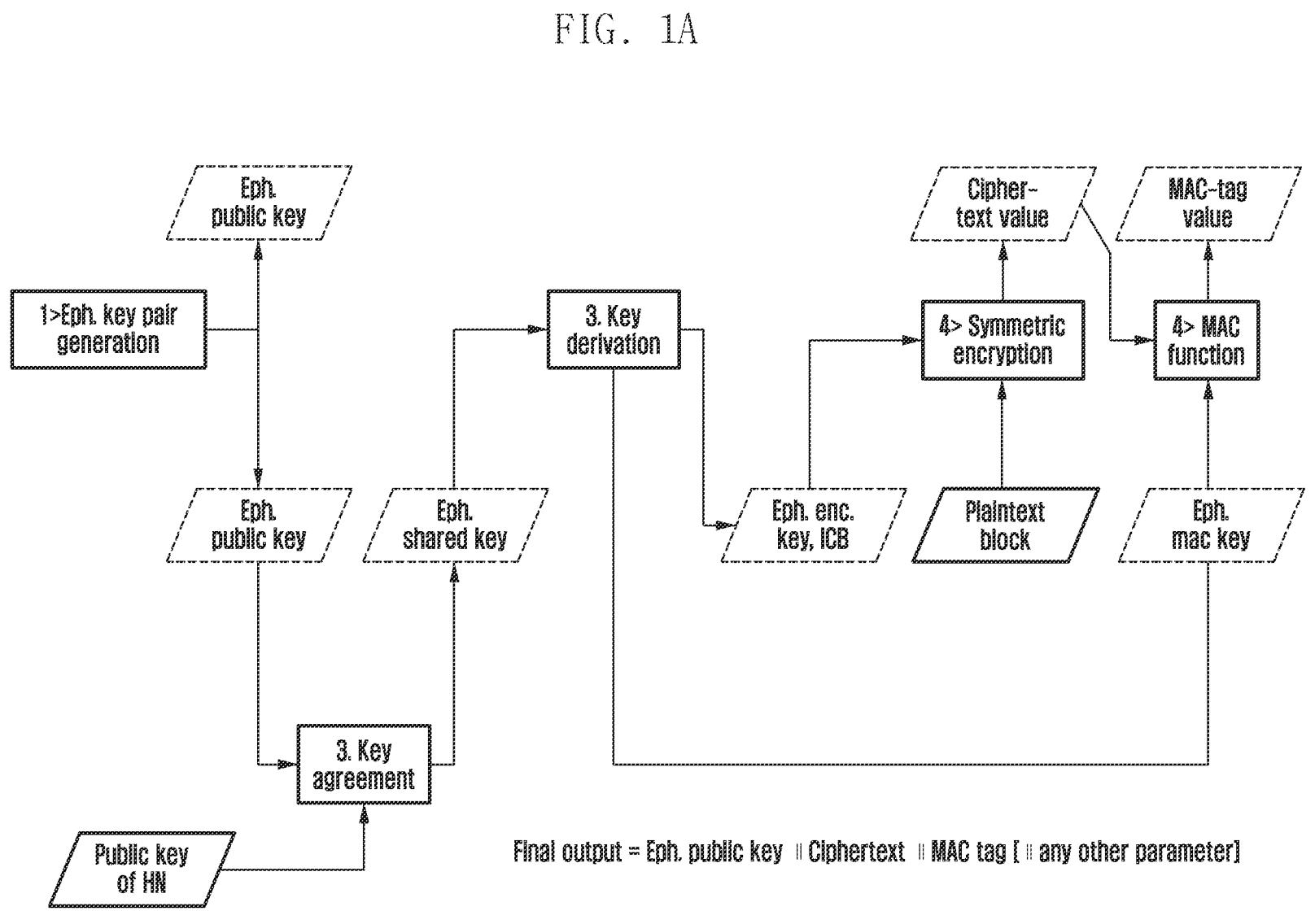

MAC-tag value

4> MAC function

Eph. mac key

Cipher-text value

4> Symmetric encryption

Plaintext block

Eph. enc. key, ICB

3. Key derivation

Eph. shared key

3. Key agreement

Eph. public key

1>Eph. key pair generation

Eph. public key

Public key of HN

Final output = Eph. public key || Ciphertext || MAC tag [ || any other parameter]

FIG. 13

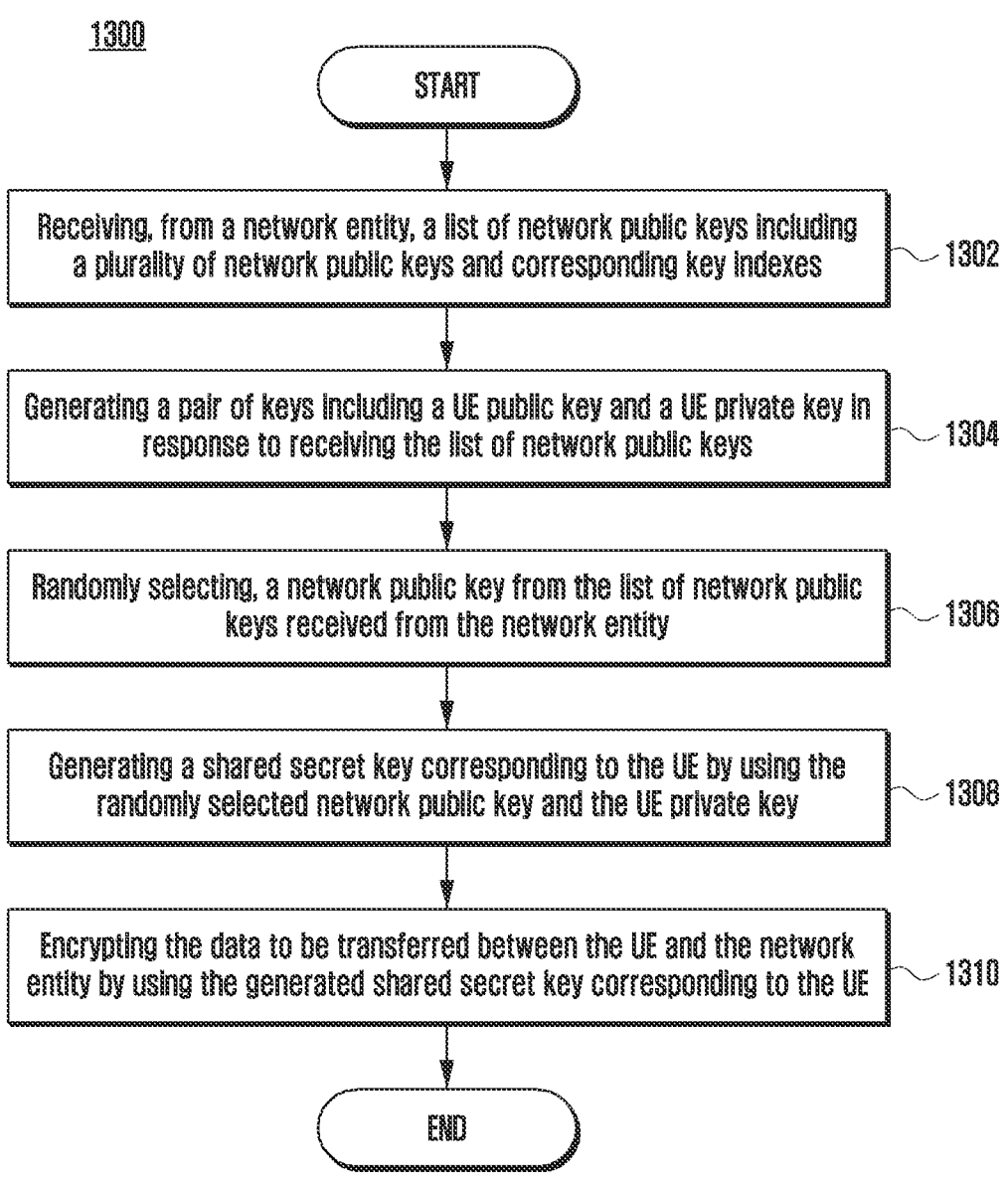

1300

START

Receiving, from a network entity, a list of network public keys including a plurality of network public keys and corresponding key indexes ~ 1302

Generating a pair of keys including a UE public key and a UE private key in response to receiving the list of network public keys ~ 1304

Randomly selecting, a network public key from the list of network public keys received from the network entity ~ 1306

Generating a shared secret key corresponding to the UE by using the randomly selected network public key and the UE private key ~ 1308

Encrypting the data to be transferred between the UE and the network entity by using the generated shared secret key corresponding to the UE ~ 1310

END

FIG. 14

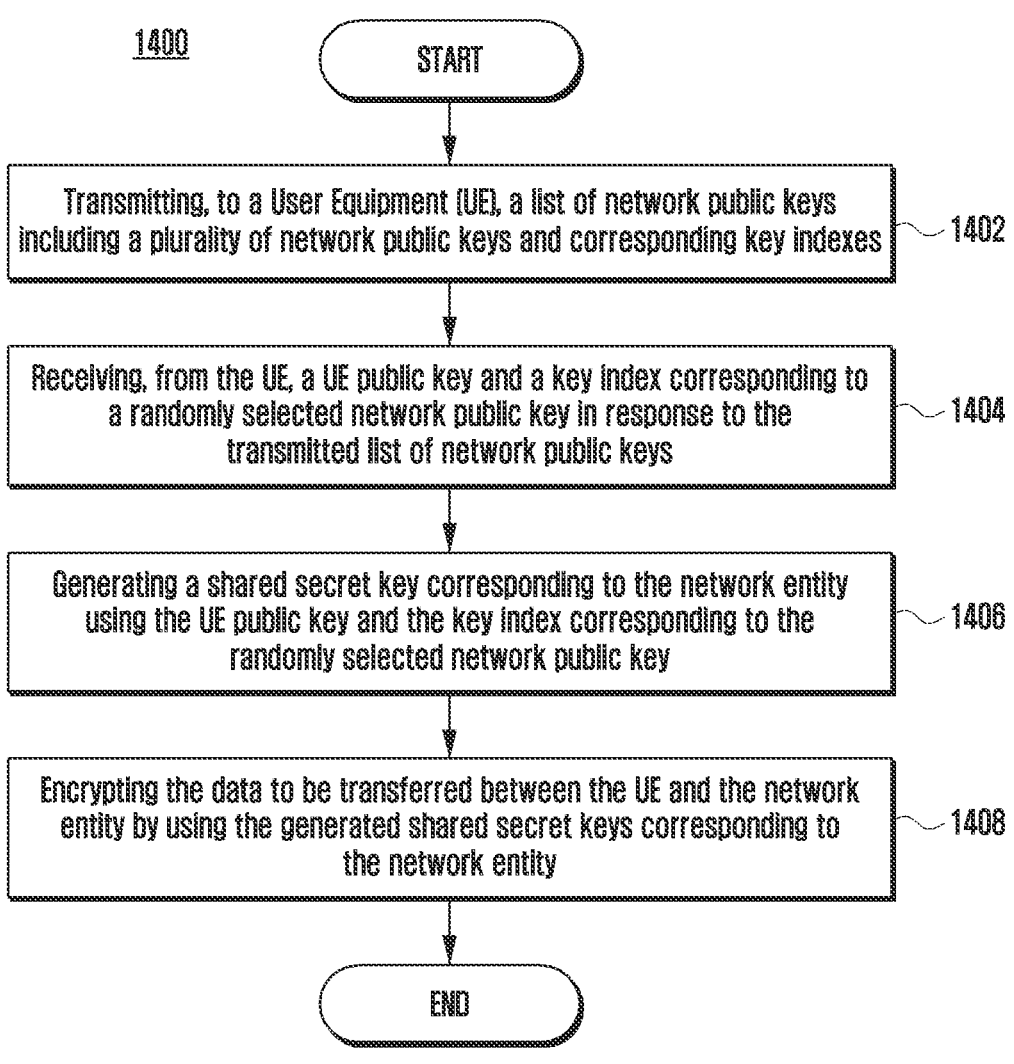

1400

START

Transmitting, to a User Equipment (UE), a list of network public keys including a plurality of network public keys and corresponding key indexes — 1402

Receiving, from the UE, a UE public key and a key index corresponding to a randomly selected network public key in response to the transmitted list of network public keys — 1404

Generating a shared secret key corresponding to the network entity using the UE public key and the key index corresponding to the randomly selected network public key — 1406

Encrypting the data to be transferred between the UE and the network entity by using the generated shared secret keys corresponding to the network entity — 1408

END

FIG. 15

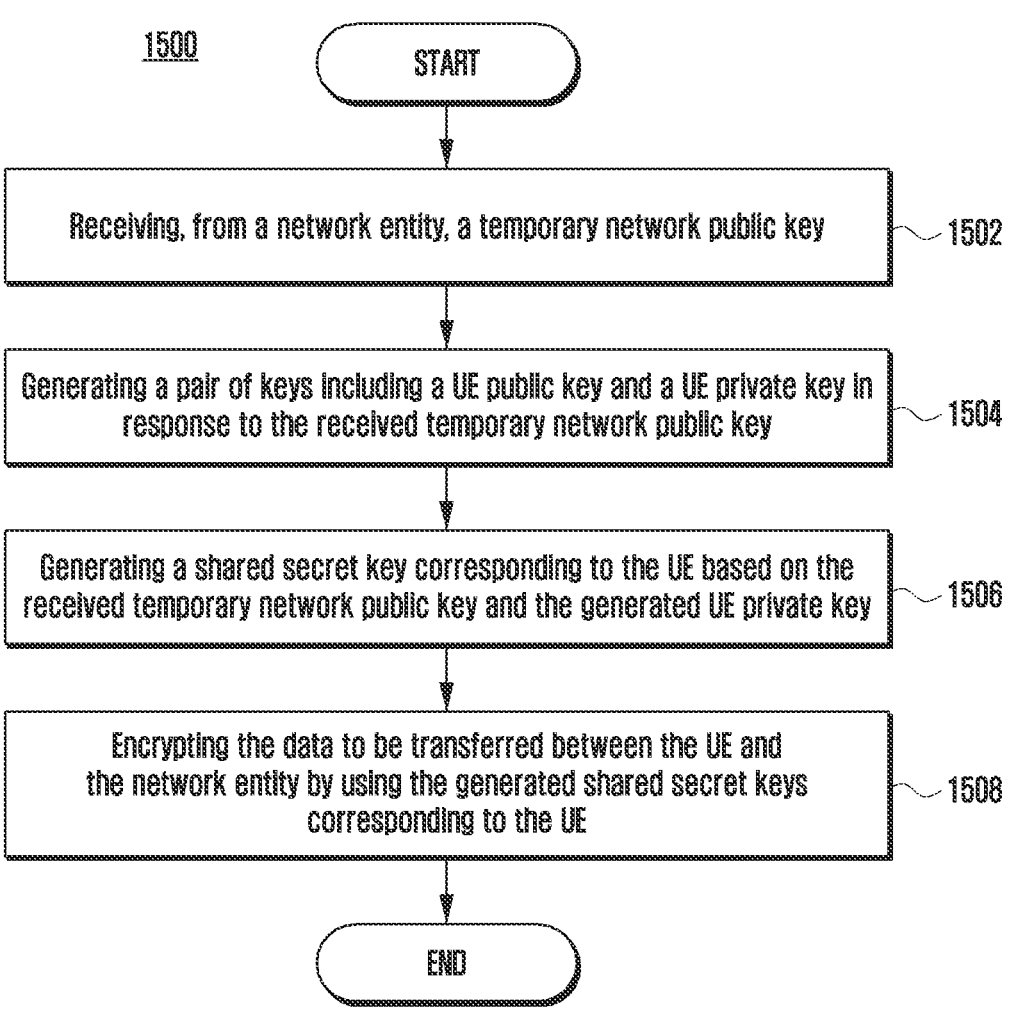

1500

START

↓

Receiving, from a network entity, a temporary network public key — 1502

↓

Generating a pair of keys including a UE public key and a UE private key in response to the received temporary network public key — 1504

↓

Generating a shared secret key corresponding to the UE based on the received temporary network public key and the generated UE private key — 1506

↓

Encrypting the data to be transferred between the UE and the network entity by using the generated shared secret keys corresponding to the UE — 1508

↓

END

FIG. 16

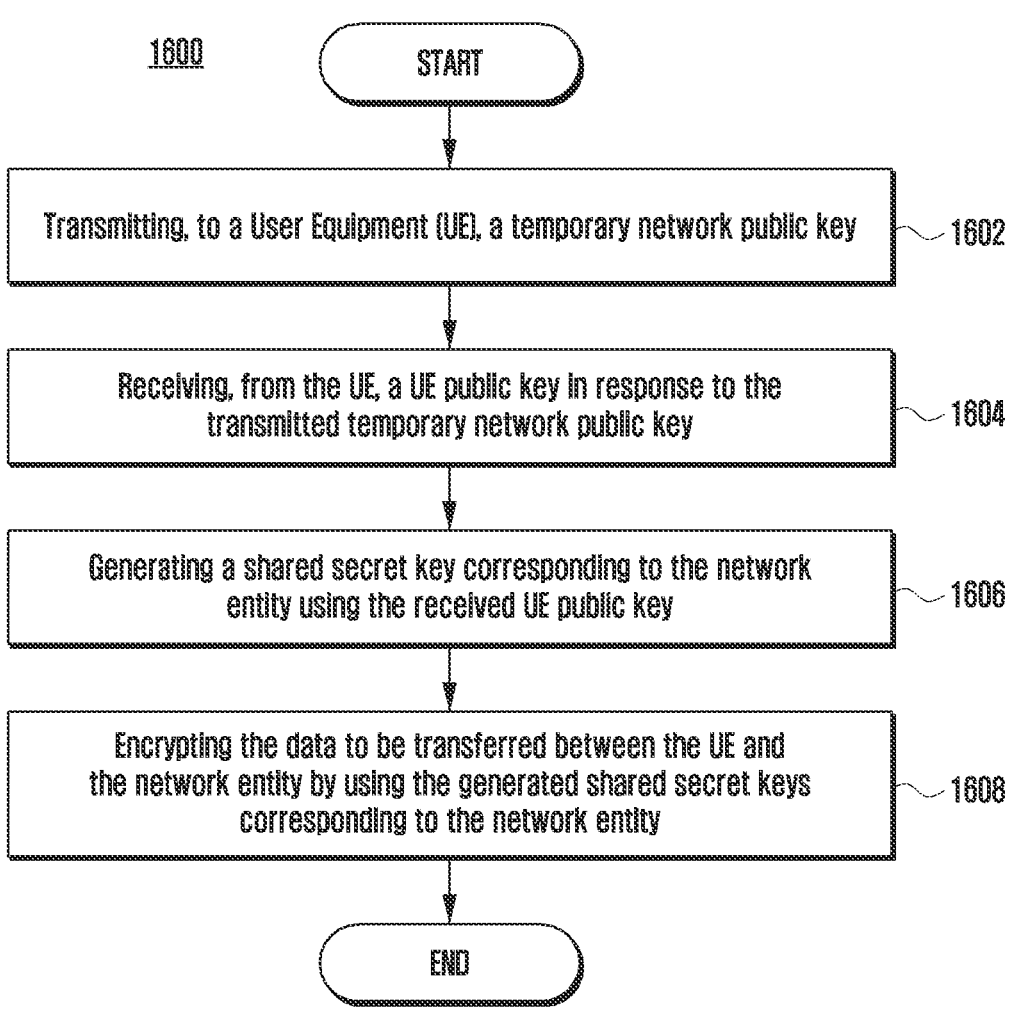

<u>1600</u>

START

Transmitting, to a User Equipment (UE), a temporary network public key ~1602

Receiving, from the UE, a UE public key in response to the transmitted temporary network public key ~1604

Generating a shared secret key corresponding to the network entity using the received UE public key ~1606

Encrypting the data to be transferred between the UE and the network entity by using the generated shared secret keys corresponding to the network entity ~1608

END

FIG. 17

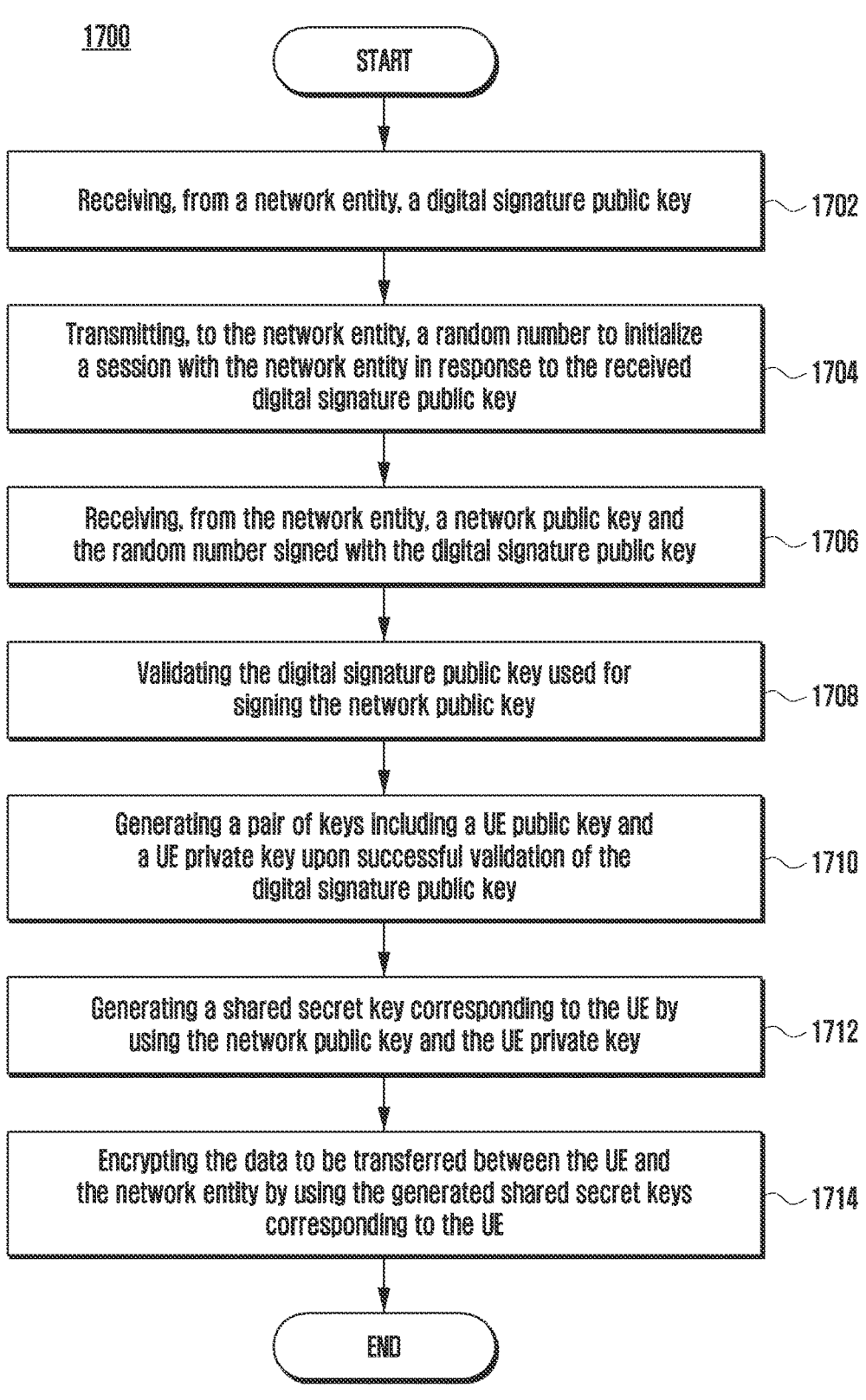

1700

START

Receiving, from a network entity, a digital signature public key ~ 1702

Transmitting, to the network entity, a random number to initialize a session with the network entity in response to the received digital signature public key ~ 1704

Receiving, from the network entity, a network public key and the random number signed with the digital signature public key ~ 1706

Validating the digital signature public key used for signing the network public key ~ 1708

Generating a pair of keys including a UE public key and a UE private key upon successful validation of the digital signature public key ~ 1710

Generating a shared secret key corresponding to the UE by using the network public key and the UE private key ~ 1712

Encrypting the data to be transferred between the UE and the network entity by using the generated shared secret keys corresponding to the UE ~ 1714

END

FIG. 18

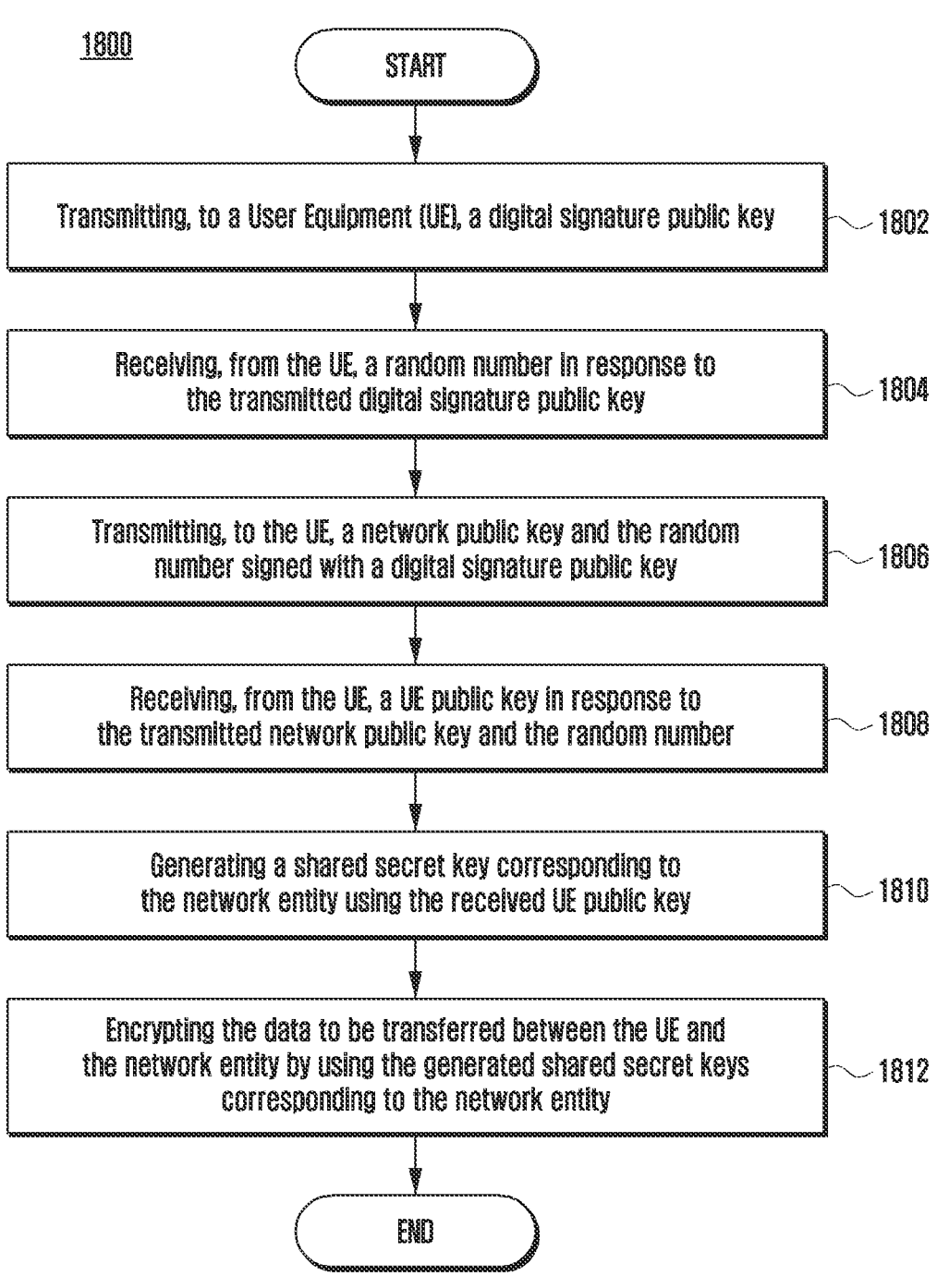

1800

START

Transmitting, to a User Equipment (UE), a digital signature public key — 1802

Receiving, from the UE, a random number in response to the transmitted digital signature public key — 1804

Transmitting, to the UE, a network public key and the random number signed with a digital signature public key — 1806

Receiving, from the UE, a UE public key in response to the transmitted network public key and the random number — 1808

Generating a shared secret key corresponding to the network entity using the received UE public key — 1810

Encrypting the data to be transferred between the UE and the network entity by using the generated shared secret keys corresponding to the network entity — 1812

END

METHOD AND APPARATUS FOR DYNAMIC DATA ENCRYPTION IN A COMMUNICATION SYSTEM WITH FORWARD SECRECY

CROSS-REFERENCE TO RELATED APPLICATION(S)

This application is based on and claims priority under 35 U.S.C. § 119(a) of an Indian Provisional patent application number 202341012160, filed on Feb. 22, 2023, in the Indian Patent Office, and of an Indian Complete patent application number 202341012160, filed on Dec. 15, 2023, in the Indian Patent Office, the disclosure of each of which is incorporated by reference herein in its entirety.

BACKGROUND

1. Field

The disclosure relates to methods and system for dynamic data encryption in a communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication system and a dynamic data encryption in a communication system.

Additional aspects will be set forth in part in the description which follows and, in part, will be apparent from the description, or may be learned by practice of the presented embodiments.

In accordance with an aspect of the disclosure, a method performed by a terminal for dynamic data encryption in a communication system is provided. The method includes receiving, by the terminal from a network entity, a list of network public keys including a plurality of network public keys and corresponding key indexes, generating, by the terminal, a pair of keys including a user equipment (UE) public key and a UE private key in response to receiving the list of network public keys, randomly selecting, by the terminal, a network public key from the list of network public keys received from the network entity, generating, by the terminal, a shared secret key corresponding to the UE by using the randomly selected network public key and the UE private key, and encrypting, by the terminal, data to be transferred between the UE and the network entity by using the generated shared secret key corresponding to the UE.

In accordance with another aspect of the disclosure, a method performed by a network entity for dynamic data encryption in a communication system is provided. The method includes transmitting, by the network entity, to a terminal, a list of network public keys including a plurality of network public keys and corresponding key indexes, receiving, by the network entity, from the terminal, a user equipment (UE) public key and a key index corresponding to a randomly selected network public key in response to the transmitted list of network public keys, generating, by the network entity, a shared secret key corresponding to the network entity using the UE public key and the key index corresponding to the randomly selected network public key, and encrypting, by the network entity, data to be transferred between the terminal and the network entity by using the generated shared secret keys corresponding to the network entity.

In accordance with another aspect of the disclosure, a method performed by a user equipment (UE) for dynamic data encryption in a communication system over a secured communication channel is provided. The method includes receiving, by the UE from a network entity, a temporary network public key, generating, by the UE, a pair of keys including a UE public key and a UE private key in response to the received temporary network public key, generating, by the UE, a shared secret key corresponding to the UE based on the received temporary network public key and the generated UE private key, and encrypting, by the UE, data to be transferred between the UE and the network entity by using the generated shared secret keys corresponding to the UE.

In accordance with another aspect of the disclosure, a method performed by a network entity for dynamic data encryption in a communication system over a secured communication channel is provided. The method includes transmitting, by the network entity to a user equipment (UE), a temporary network public key, receiving, by the network entity, from the UE, a UE public key in response to the transmitted temporary network public key, generating, by the network entity, a shared secret key corresponding to the network entity using the received UE public key, and encrypting, by the network entity, data to be transferred between the UE and the network entity by using the generated shared secret keys corresponding to the network entity.

In accordance with another aspect of the disclosure, a method performed by a user equipment (UE) for dynamic data encryption in a communication system over an unsecured communication channel is provided. The method includes receiving, by the UE from a network entity, a digital signature public key, transmitting, by the UE, to the network entity, a random number to initialize a session with the network entity in response to the received digital signature public key, receiving, by the UE, from the network entity, a network public key and the random number signed with the digital signature public key from the network, validating, by the UE, the digital signature public key used for signing the network public key, generating, by the UE, a pair of keys including a UE public key and a UE private key upon successful validation of the digital signature public key, generating, by the UE, a shared secret key corresponding to the UE by using the network public key and the UE private key, and encrypting data to be transferred between the UE and the network entity by using the generated shared secret keys corresponding to the UE.

In accordance with another aspect of the disclosure, a method performed by a network entity for dynamic data encryption in a communication system over an unsecured communication channel is provided. The method includes transmitting, by the network entity to a user equipment (UE), a digital signature public key, receiving, by the network entity from the UE, a random number in response to the transmitted digital signature public key, transmitting, by the network entity to the UE, a network public key and the random number signed with a digital signature public key, receiving, by the network entity from the UE, a UE public key in response to the transmitted network public key and the random number, generating, by the network entity, a shared secret key corresponding to the network entity using the received UE public key, and encrypting, by the network entity, data to be transferred between the UE and the network entity by using the generated shared secret keys corresponding to the network entity.

In accordance with another aspect of the disclosure, a method performed by a user equipment (UE) for dynamic data encryption in a communication system is provided. The method includes receiving, by the UE from a network entity, a digital signature public key, generating, by the UE, a random number to initialize a session with the network entity in response to the received digital signature public key, receiving, by the UE from the network entity, a list of network public keys signed with the digital signature public key, wherein the list of network public keys includes a plurality of network public keys and corresponding key indexes, validating, by the UE, the digital signature public key used for signing the list of network public keys, generating, by the UE, a pair of keys including a UE public key and a UE private key in response to successful validation of the digital signature public key, randomly selecting, by the UE, a network public key from the list of network public keys received from the network entity, generating, by the UE, a shared secret key corresponding to the UE by using the randomly selected network public key and the UE private key, and encrypting, by the UE, data to be transferred between the UE and the network entity by using the generated shared secret keys corresponding to the UE.

In accordance with another aspect of the disclosure, a method performed by a network entity for dynamic data encryption in a communication system is provided. The method includes transmitting, by the network entity to a user equipment (UE), a digital signature public key, receiving, by the network entity from the UE, a random number in response to the transmitted digital signature public key, transmitting, by the network entity to the UE, a list of network public keys and the random number signed with the digital signature public key in response to the received random number, wherein the list of network public keys includes a plurality of network public keys and corresponding key indexes, receiving, by the network entity from the UE, a UE public key and a key index corresponding to a randomly selected network public key in response to the transmitted list of network public keys, generating, by the network entity, a shared secret key corresponding to the network entity using the UE public key and the key index, and encrypting, by the network entity, data to be transferred between the UE and the network entity by using the generated shared secret keys corresponding to the network entity.

In accordance with another aspect of the disclosure, a terminal is provided. The terminal includes a transceiver, memory storing one or more computer programs, and one or more processors communicatively coupled with the transceiver and the memory, wherein the one or more computer programs include computer-executable instructions that, when executed by the one or more processors, cause the terminal to receive, from a network entity via the transceiver, a list of network public keys including a plurality of network public keys and corresponding key indexes, generate a pair of keys including a user equipment (UE) public key and a UE private key in response to receiving the list of network public keys, randomly select, a network public key from the list of network public keys received from the network entity, generate a shared secret key corresponding to the UE by using the randomly selected network public key and the UE private key, and encrypt data to be transferred between the UE and the network entity by using the generated shared secret key corresponding to the UE.

In accordance with another aspect of the disclosure, a network entity is provided. The network entity includes a transceiver, memory storing one or more computer programs and one or more processors communicatively coupled to the transceiver and the memory, wherein the one or more computer programs include computer-executable instructions that, when executed by the one or more processors, cause the network entity to transmit, to a terminal, a list of network public keys including a plurality of network public keys and corresponding key indexes, receive, from the terminal, a user equipment (UE) public key and a key index corresponding to a randomly selected network public key in response to the transmitted list of network public keys, generate a shared secret key corresponding to the network entity using the UE public key and the key index corresponding to the randomly selected network public key, and encrypt data to be transferred between the UE and the network entity by using the generated shared secret keys corresponding to the network entity.

In accordance with another aspect of the disclosure, a user equipment (UE) is provided. The UE includes a transceiver, memory storing one or more computer programs, and one or more processors communicatively coupled with the transceiver and the memory, wherein the one or more computer programs include computer-executable instructions that, when executed by the one or more processors, cause the terminal to receive, from a network entity, a temporary network public key, generate a pair of keys including a user equipment (UE) public key and a UE private key in response to the received temporary network public key, generate a shared secret key corresponding to the UE based on the received temporary network public key and the generated UE private key, and encrypt data to be transferred between the UE and the network entity by using the generated shared secret keys corresponding to the UE.

In accordance with another aspect of the disclosure, a network entity is provided. The network entity includes a transceiver, memory storing one or more computer programs and one or more processors communicatively coupled to the transceiver and the memory, wherein the one or more computer programs include computer-executable instructions that, when executed by the one or more processors, cause the network entity to transmit, to a user equipment (UE), a temporary network public key, receive, from the UE, a UE public key in response to the transmitted temporary network public key, generate a shared secret key corresponding to the network entity using the received UE public key, and encrypt data to be transferred between the UE and the network entity by using the generated shared secret keys corresponding to the network entity.

In accordance with another aspect of the disclosure, a user equipment (UE) is provided. The UE includes a transceiver, memory and one or more processors communicatively coupled to the transceiver and the memory, wherein the one or more computer programs include computer-executable instructions that, when executed by the one or more processors, cause the network entity to receive, from a network entity, a digital signature public key, transmit, to the network entity, a random number to initialize a session with the network entity in response to the received digital signature public key, receive, from the network entity, a network public key and the random number signed with the digital signature public key from the network, validate the digital signature public key used for signing the network public key, generate a pair of keys including a UE public key and a UE private key upon successful validation of the digital signature public key, generate a shared secret key corresponding to the UE by using the network public key and the UE private key, and encrypt data to be transferred between the UE and the network entity by using the generated shared secret keys corresponding to the UE.

In accordance with another aspect of the disclosure, a network entity is provided. The network entity includes a transceiver, memory and one processors communicatively coupled to the transceiver and the memory, wherein the one or more computer programs include computer-executable instructions that, when executed by the one or more processors, cause the network entity to transmit, to a user equipment (UE), a digital signature public key, receive, from the UE, a random number in response to the transmitted digital signature public key, transmit, to the UE, a network public key and the random number signed with a digital signature public key, receive, from the UE, a UE public key in response to the transmitted network public key and the random number, generate a shared secret key corresponding to the network entity using the received UE public key, encrypt data to be transferred between the UE and the network entity by using the generated shared secret keys corresponding to the network entity.

In accordance with another aspect of the disclosure, a user equipment (UE) is provided. The UE includes a transceiver and memory, and one or more processors communicatively coupled to the transceiver and the memory, wherein the one or more computer programs include computer-executable instructions that, when executed by the one or more processors, cause the network entity to receive, from a network entity, a digital signature public key, generate a random number to initialize a session with the network entity in response to the received digital signature public key, receive, from the network entity, a list of network public keys signed with the digital signature public key, wherein the list of network public keys includes a plurality of network public keys and corresponding key indexes, validate the digital signature public key used for signing the list of network public keys, generate a pair of keys including a UE public key and a UE private key in response to successful validation of the digital signature public key, randomly select, by the UE, a network public key from the list of network public keys received from the network entity, generate a shared secret key corresponding to the UE by using the randomly selected network public key and the UE private key, and encrypt data to be transferred between the UE and the network entity by using the generated shared secret keys corresponding to the UE.

In accordance with another aspect of the disclosure, a network entity is provided. The network entity includes a transceiver, memory and at one or more processors communicatively coupled to the transceiver and the memory, wherein the one or more computer programs include computer-executable instructions that, when executed by the one or more processors, cause the network entity to transmit, to a user equipment (UE), a digital signature public key, receive, from the UE, a random number in response to the transmitted digital signature public key, transmit, to the UE, a list of network public keys and the random number signed with the digital signature public key in response to the received random number, wherein the list of network public keys includes a plurality of network public keys and corresponding key indexes, receive, from the UE, a UE public key and a key index corresponding to a randomly selected network public key in response to the transmitted list of network public keys, generate a shared secret key corresponding to the network entity using the UE public key and the key index, and encrypt data to be transferred between the UE and the network entity by using the generated shared secret keys corresponding to the network entity.

In accordance with another aspect of the disclosure, one or more non-transitory computer-readable storage media storing one or more computer programs including computer-executable instructions that, when executed by one or more processors of a terminal performing dynamic data encryption in a communication system, cause the terminal to perform operations are provided. The operations include receiving, by the terminal from a network entity, a list of network public keys including a plurality of network public keys and corresponding key indexes, generating, by the terminal, a pair of keys including a user equipment (UE) public key and a UE private key in response to receiving the list of network public keys, selecting, by the terminal, a network public key from the list of network public keys received from the network entity, generating, by the terminal, a shared secret key corresponding to the terminal by using the randomly selected network public key and the UE private key, and encrypting, by the terminal, data to be transferred between the terminal and the network entity by using the generated shared secret key corresponding to the terminal.

According to an embodiment of the disclosure, a terminal can efficiently perform a communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent

Figure 1B:
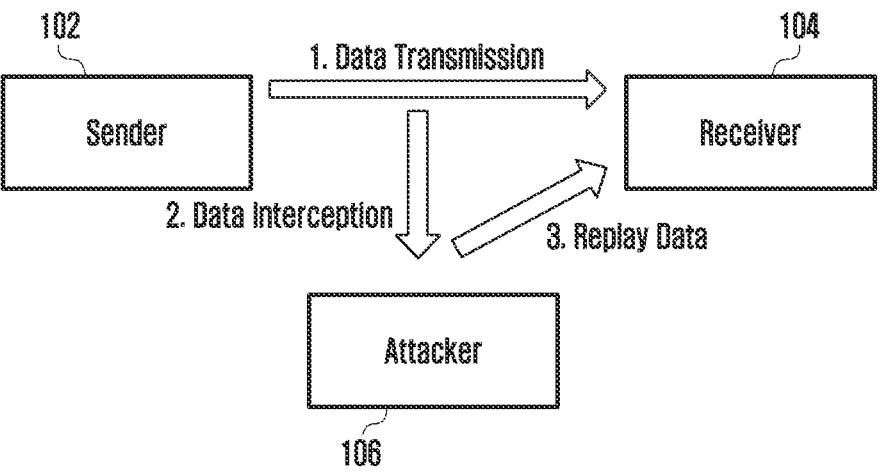
Figure 2:
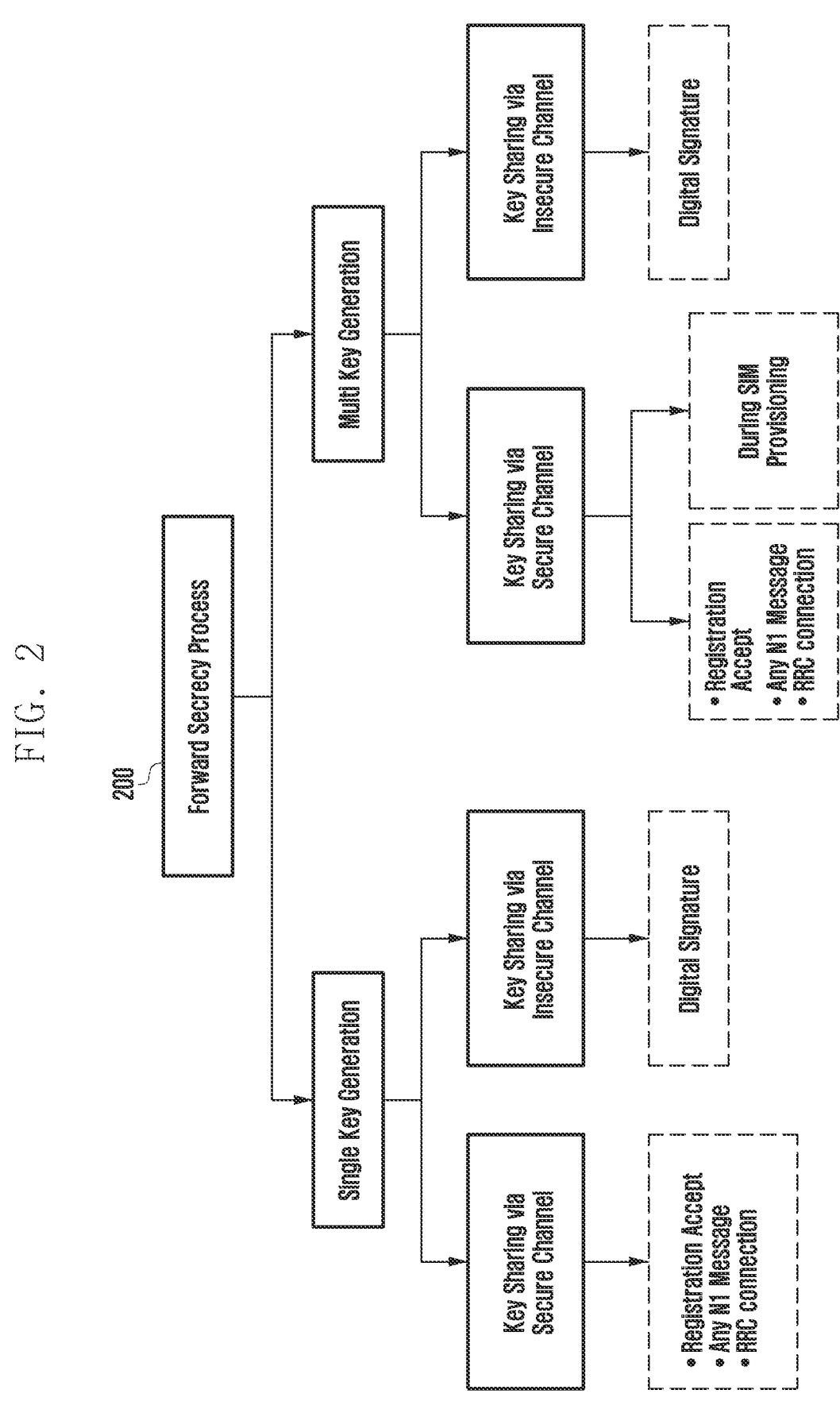
Figure 3:
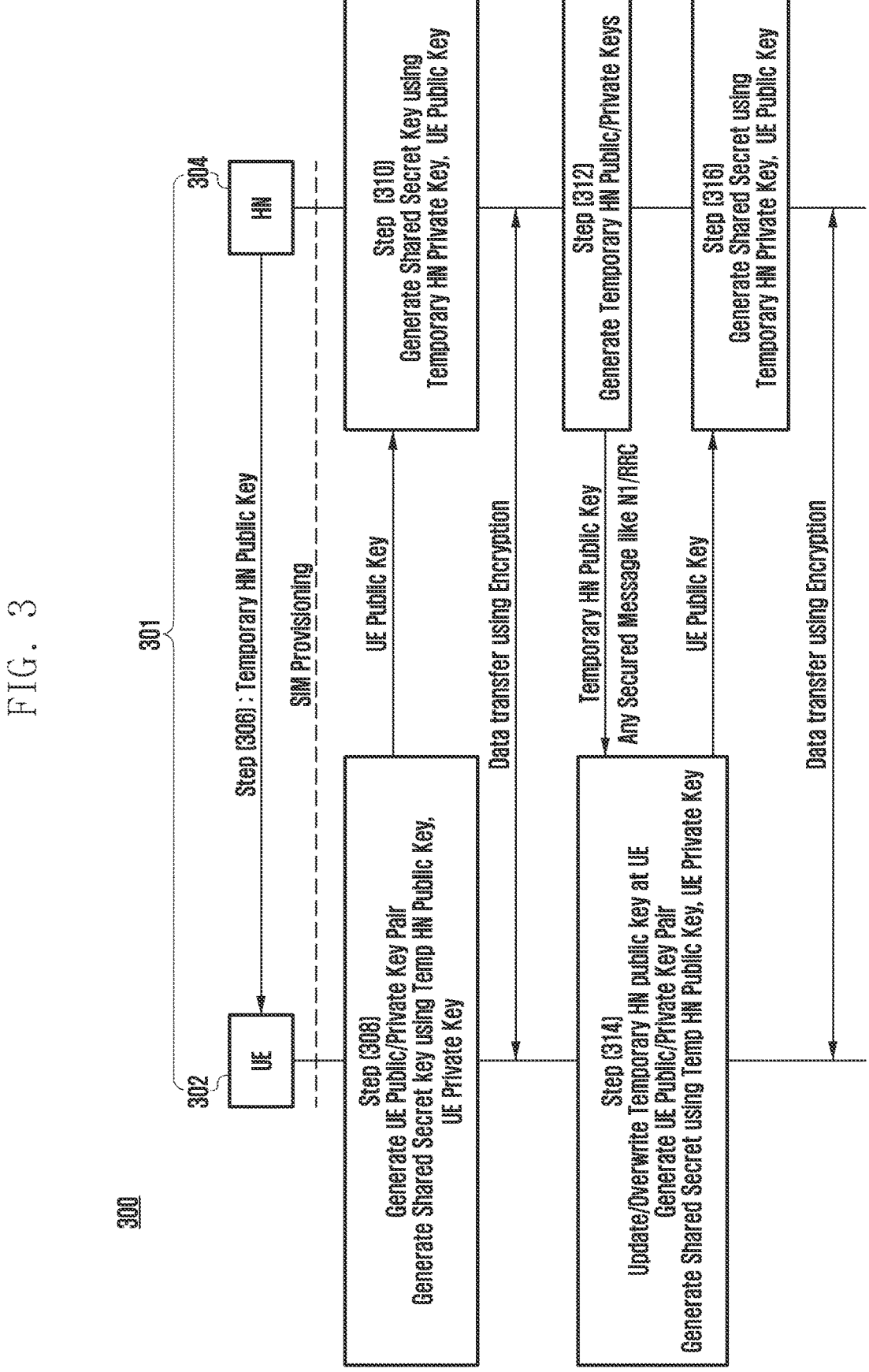
Figure 4:
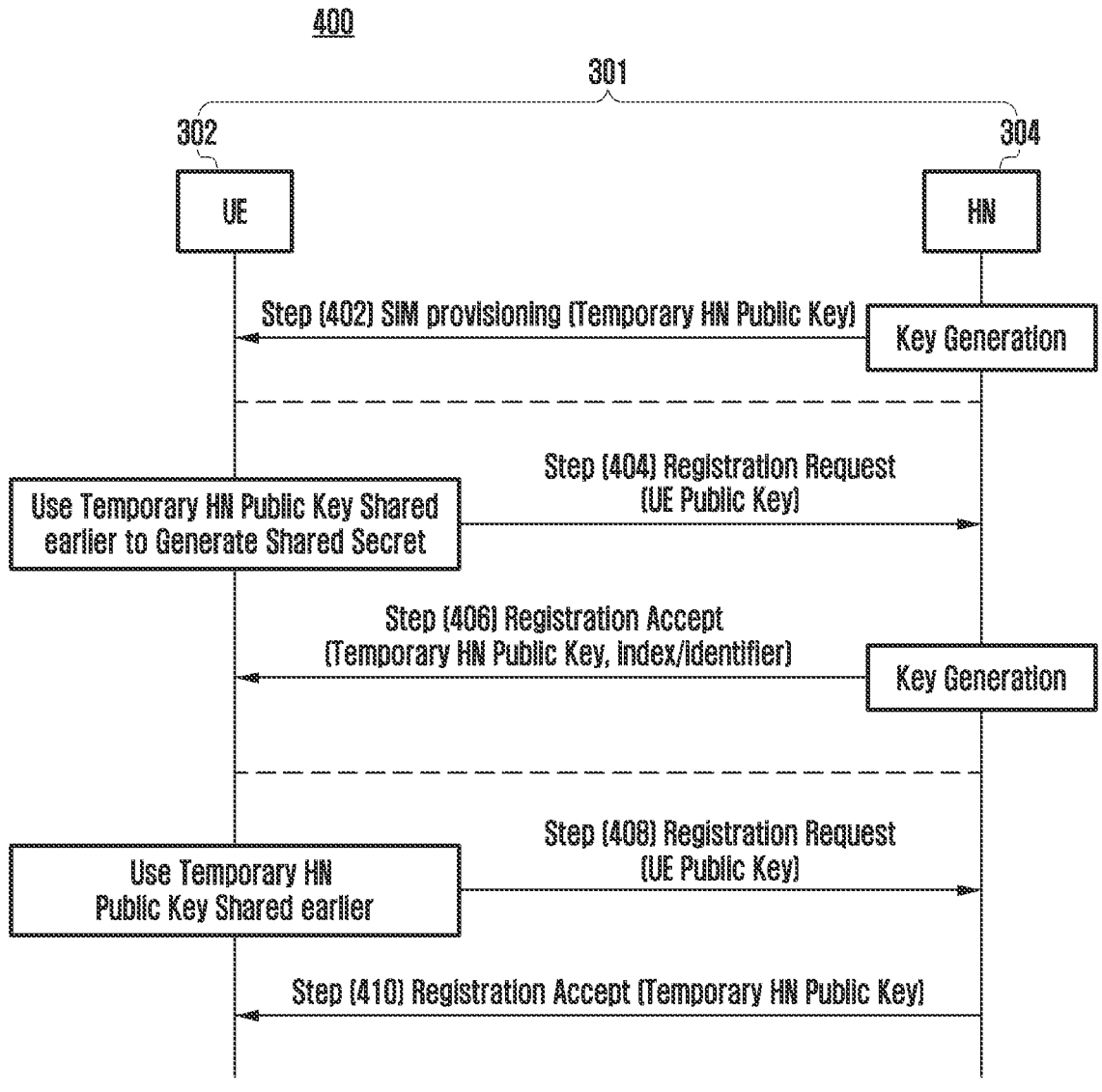
Figure 5:
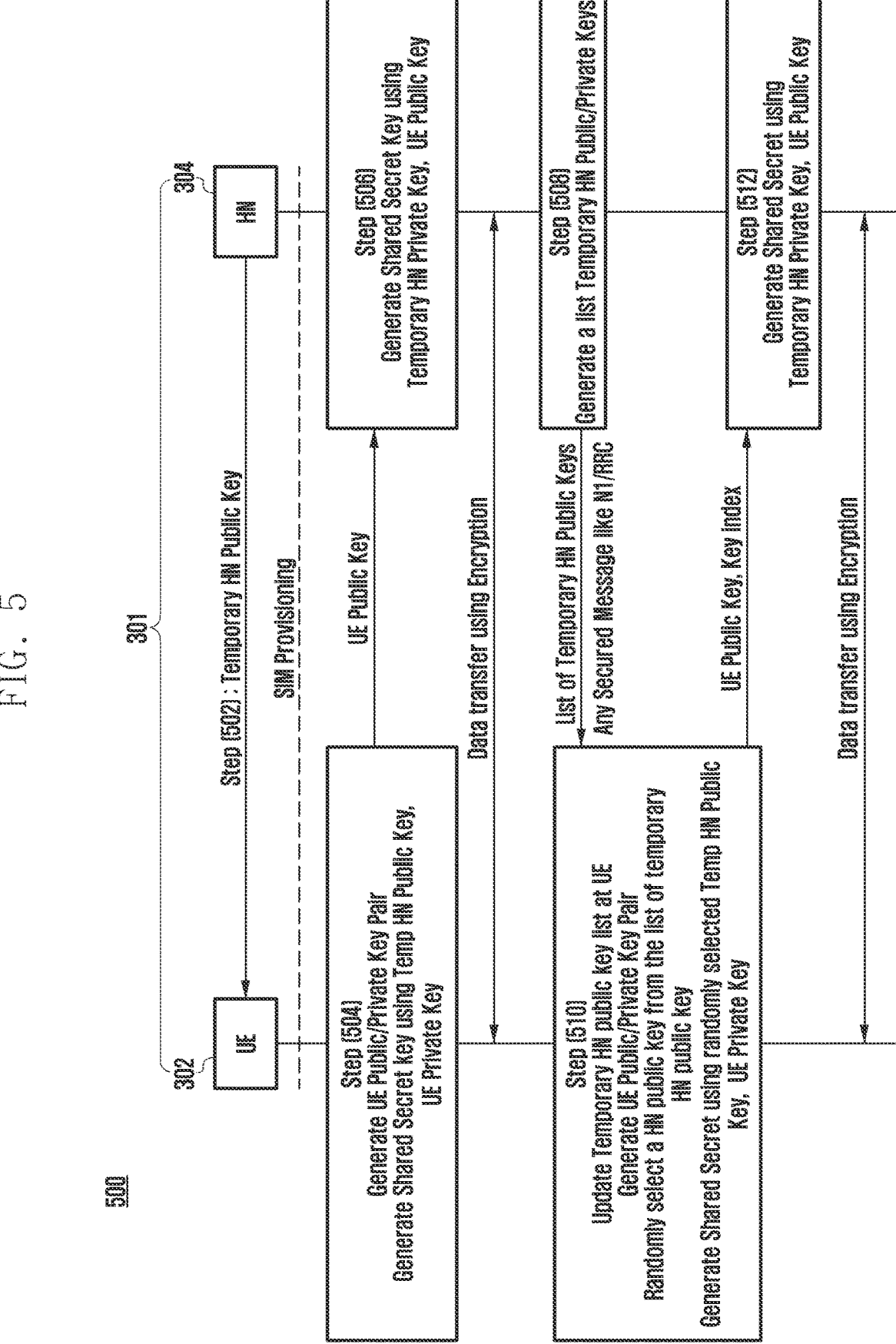
Figure 6:
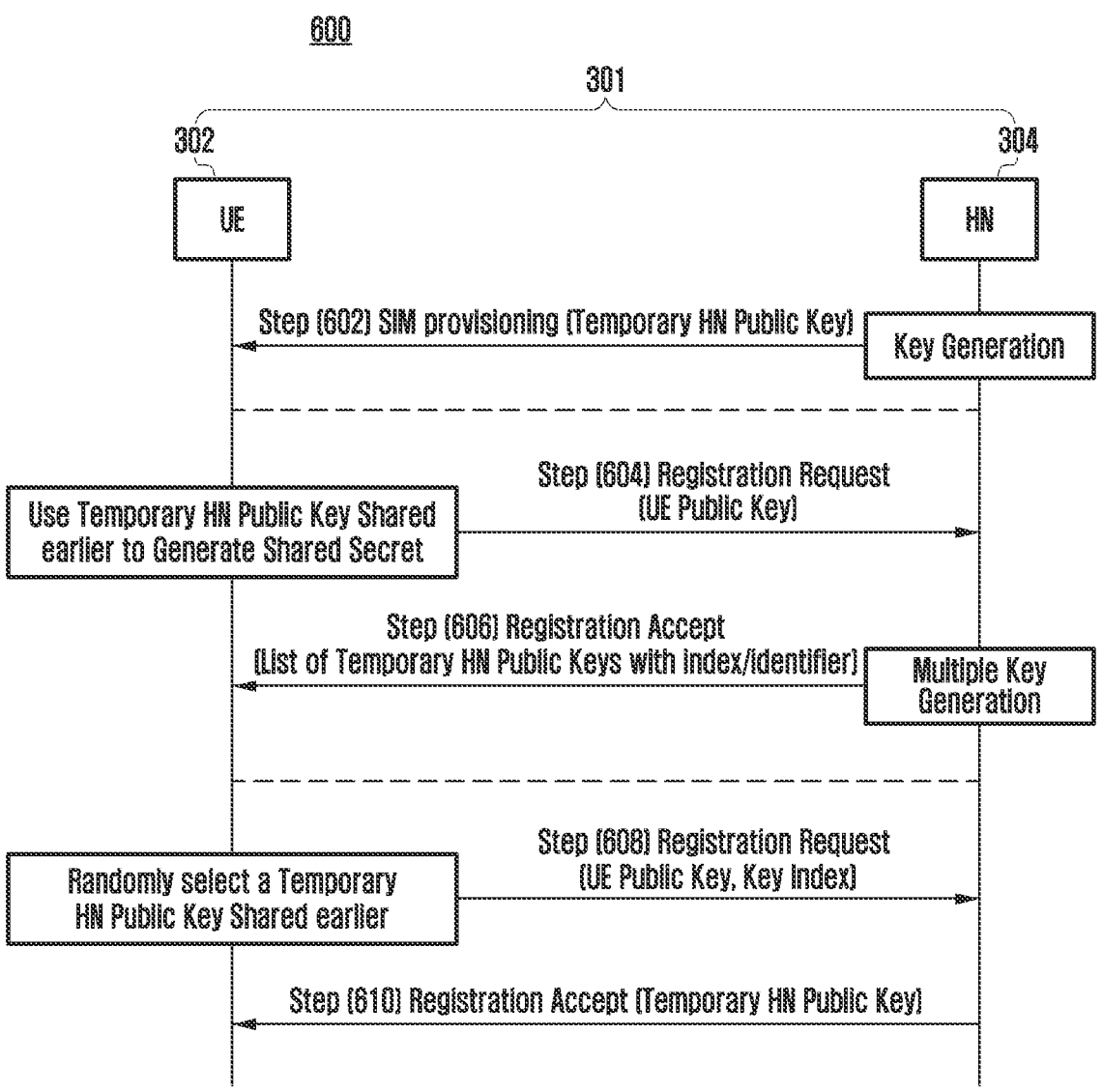
Figure 7:
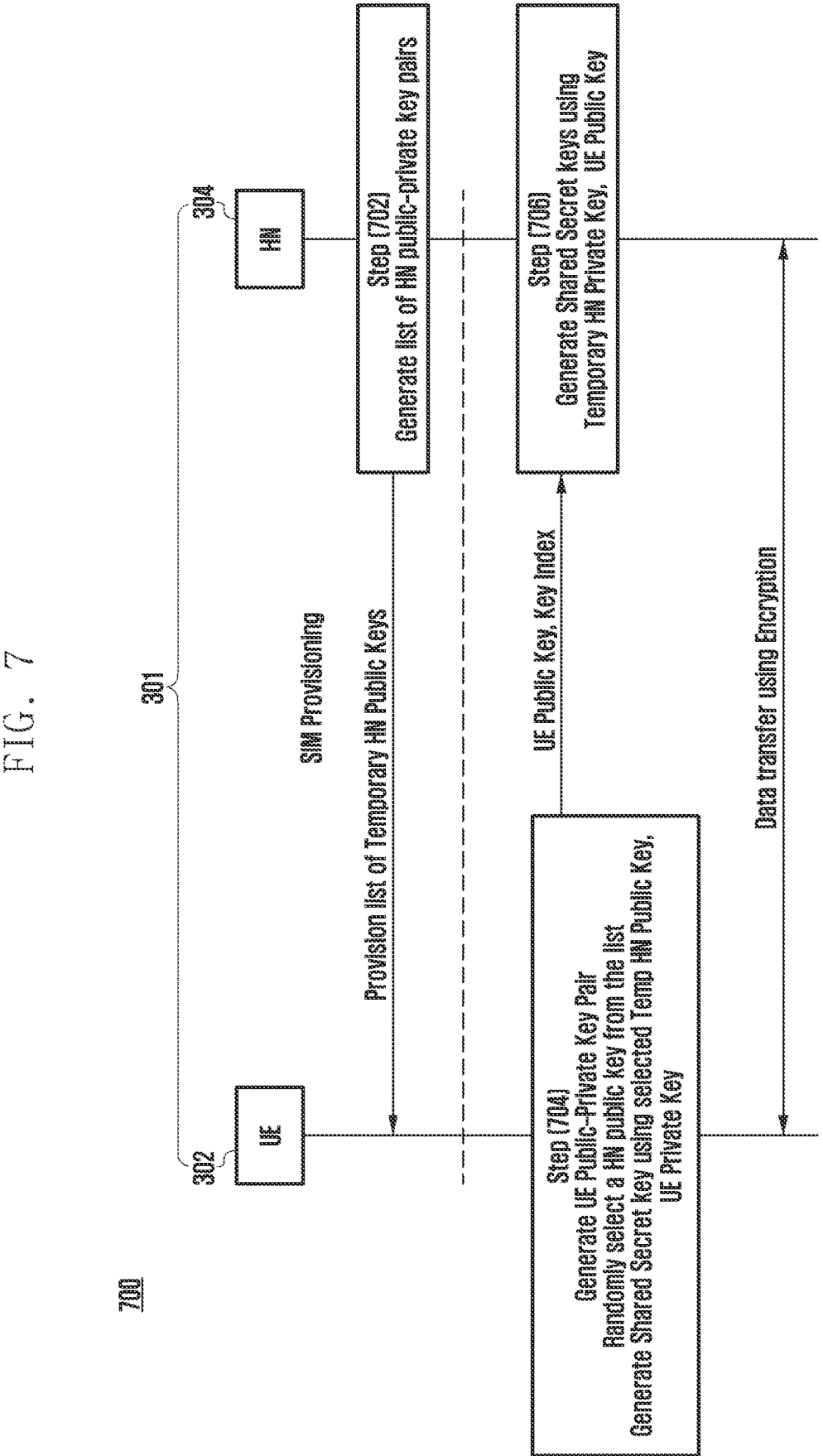
Figure 8:
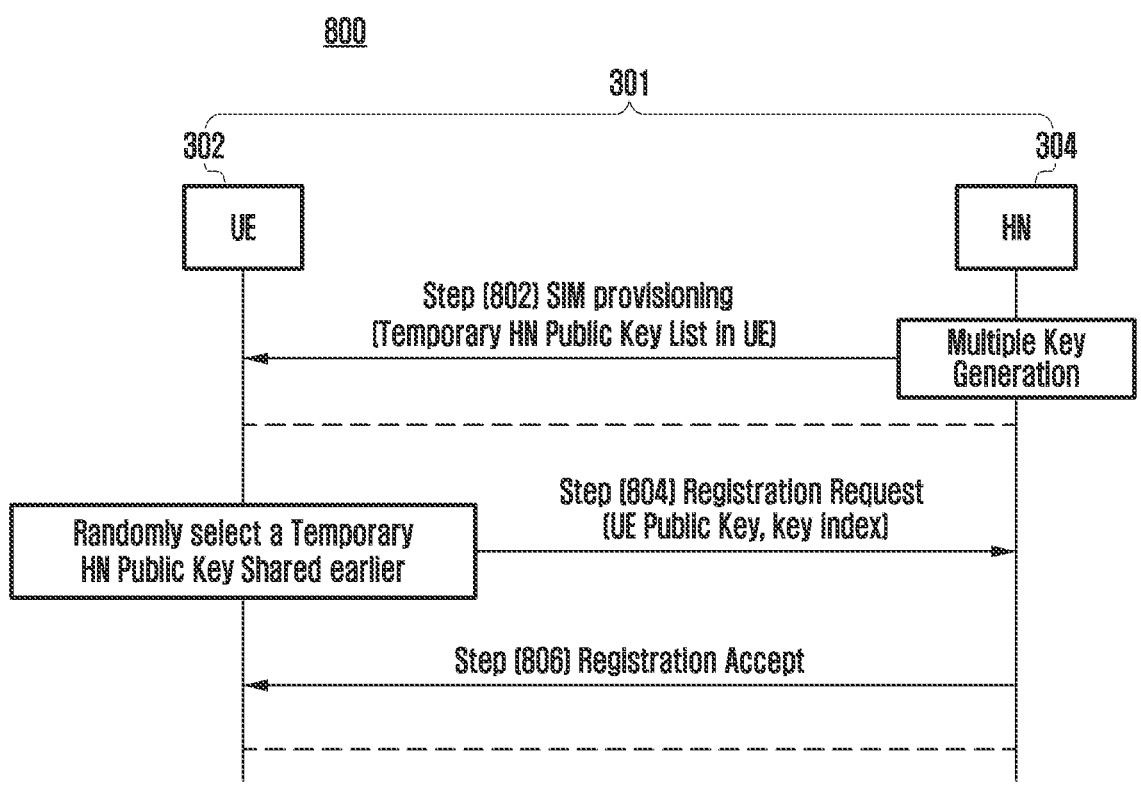
Figure 9:
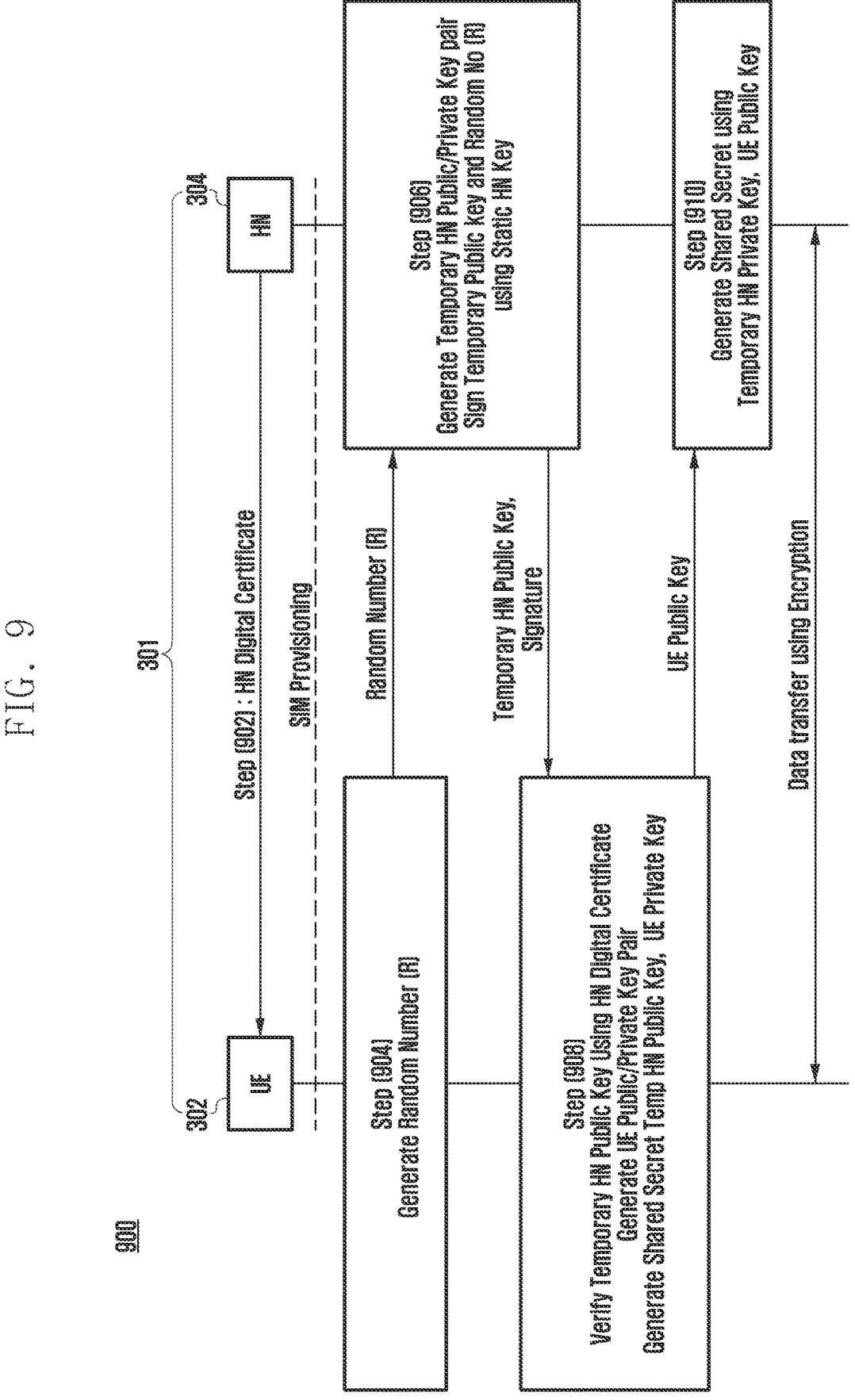
Figure 10:
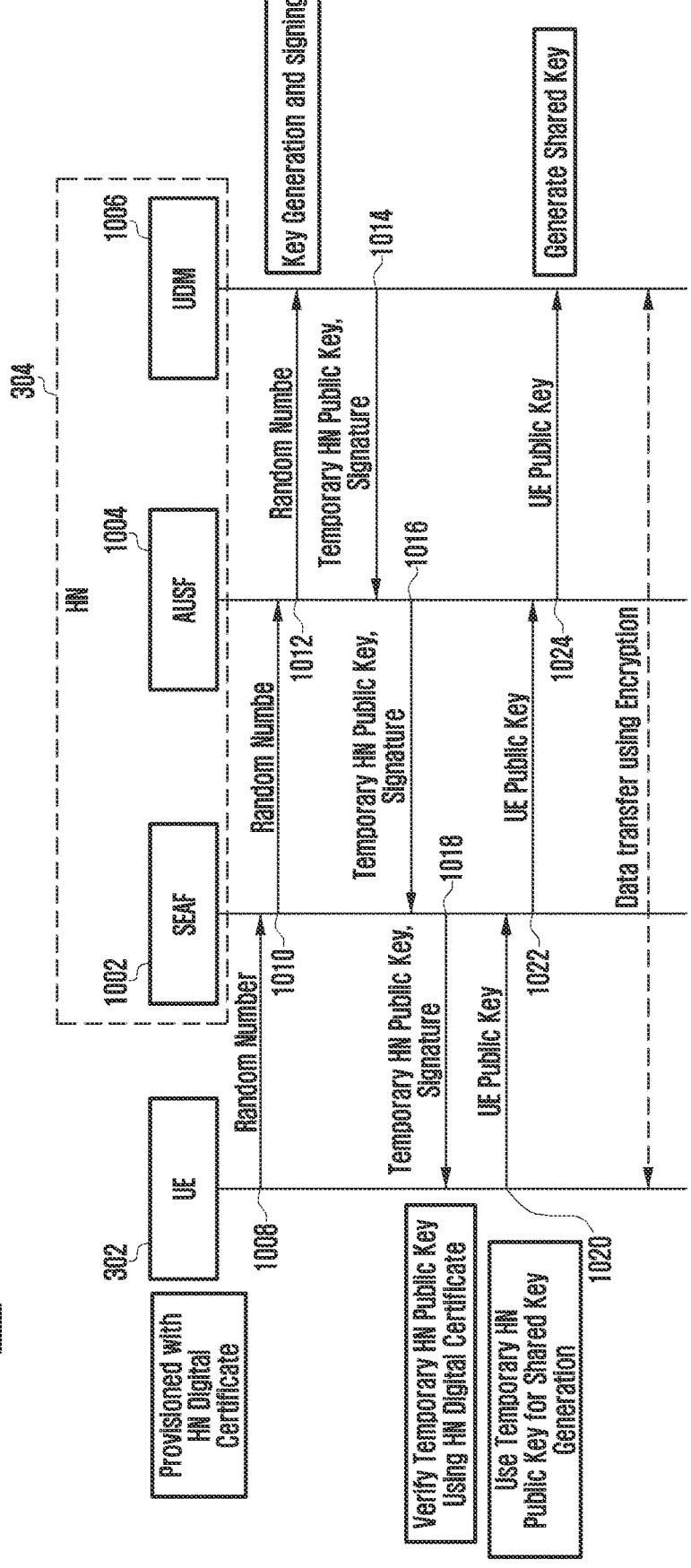
Figure 11:
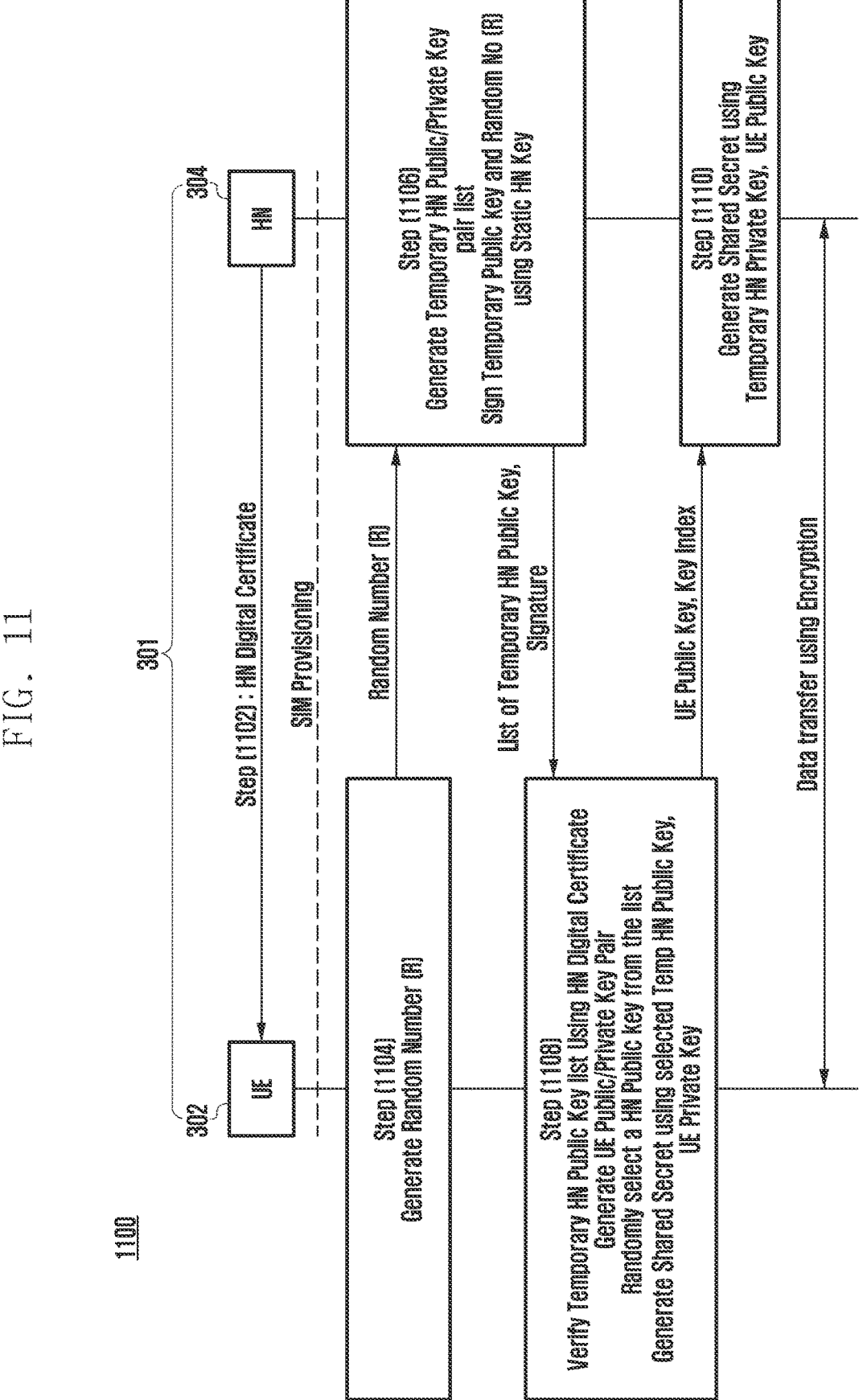
Figure 12:
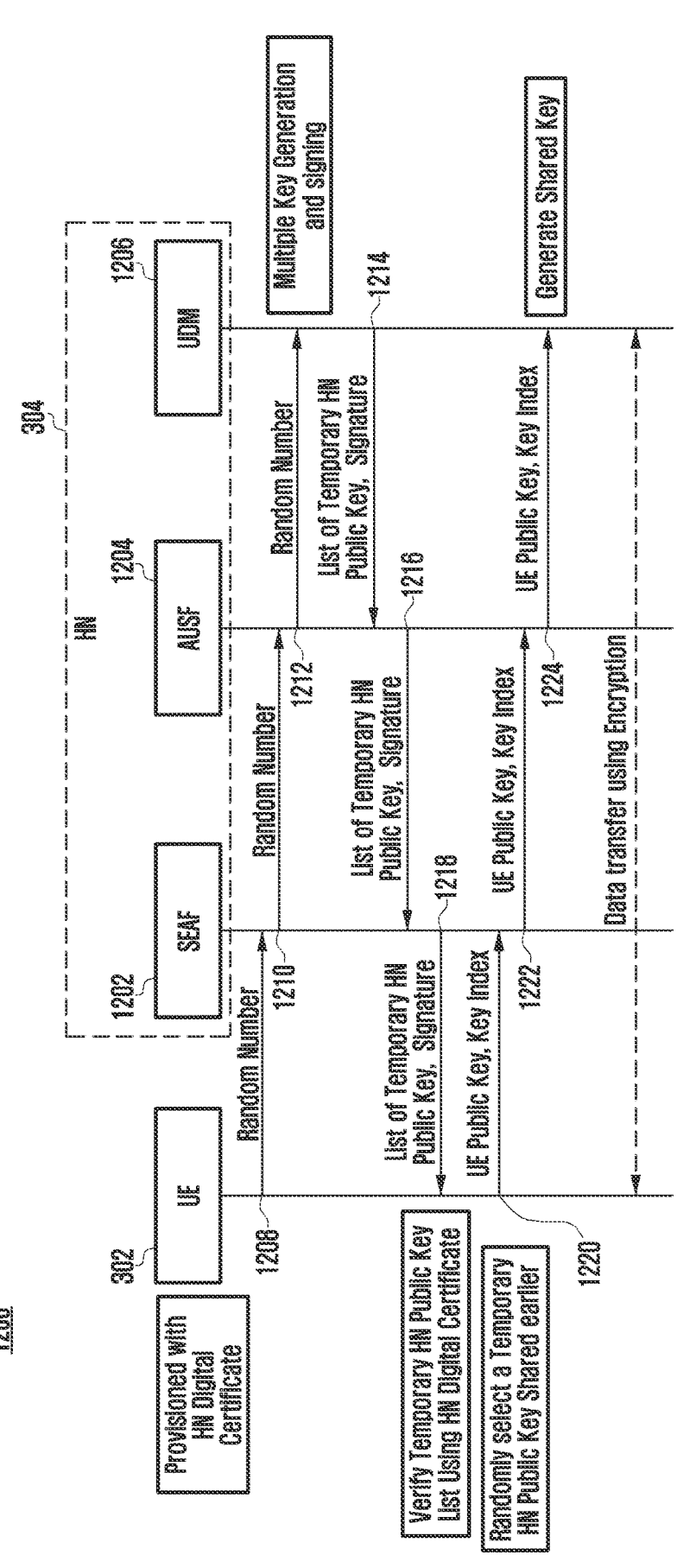
Figure 19:
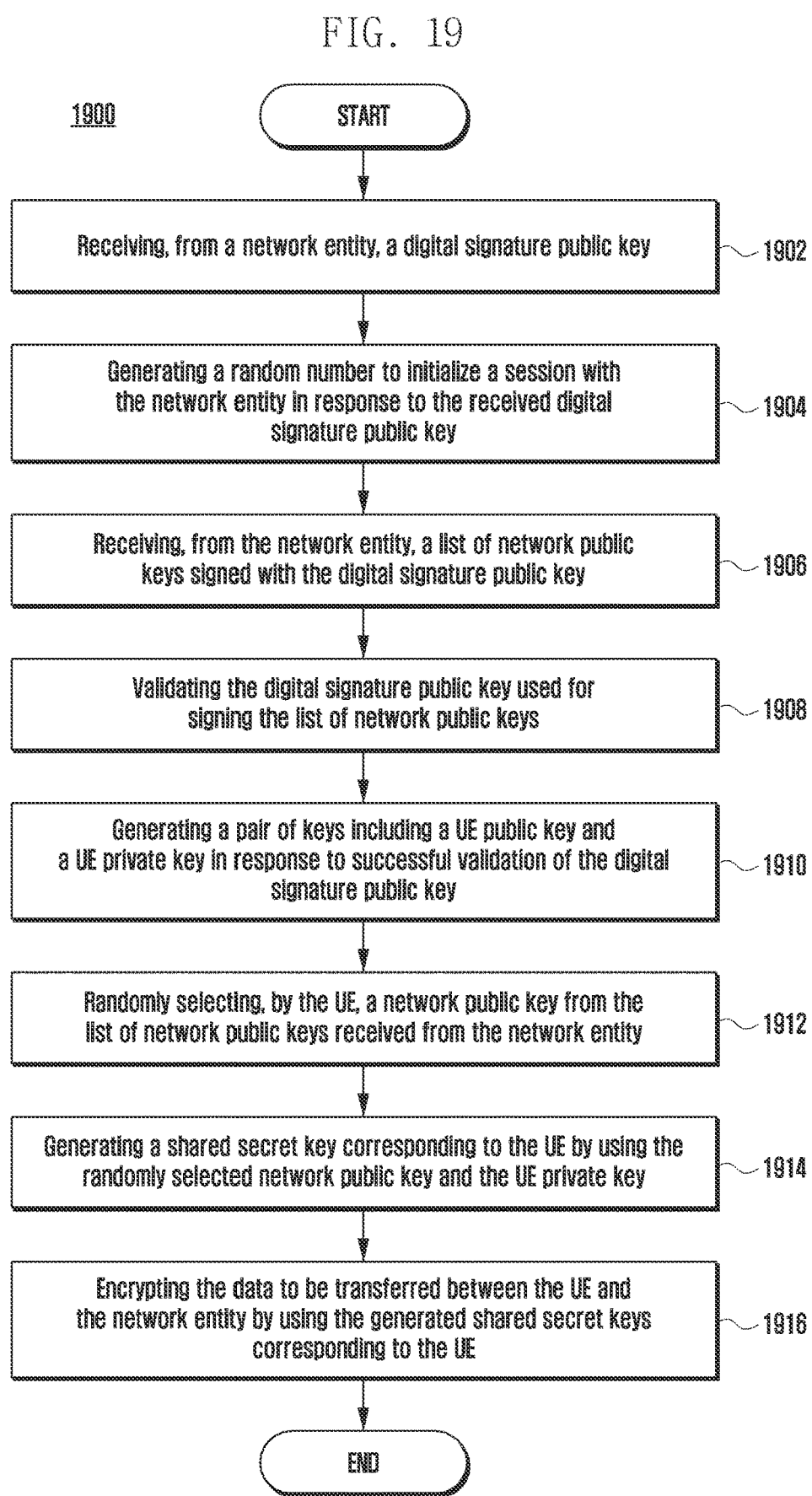
Figure 20:
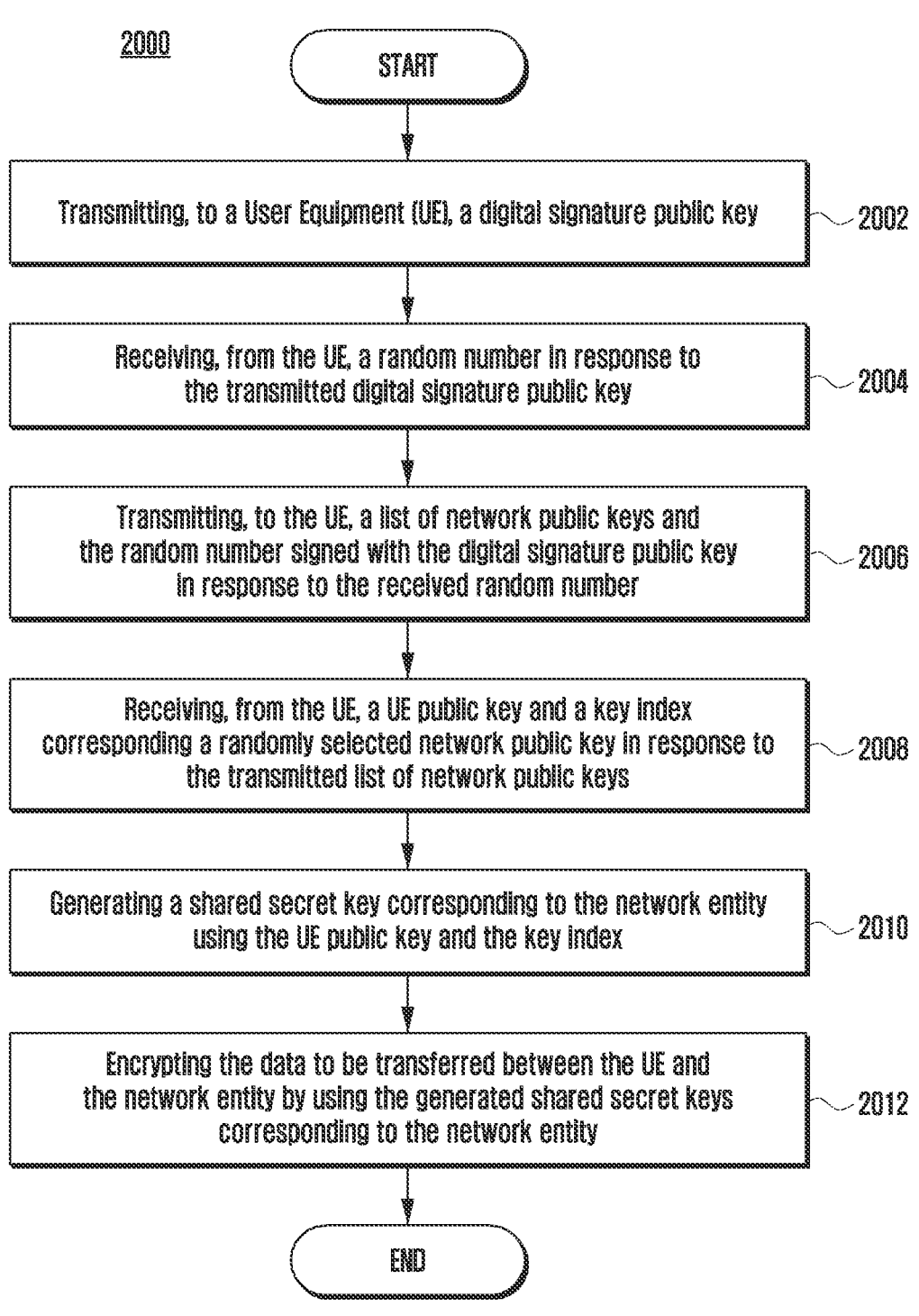
Figure 21:
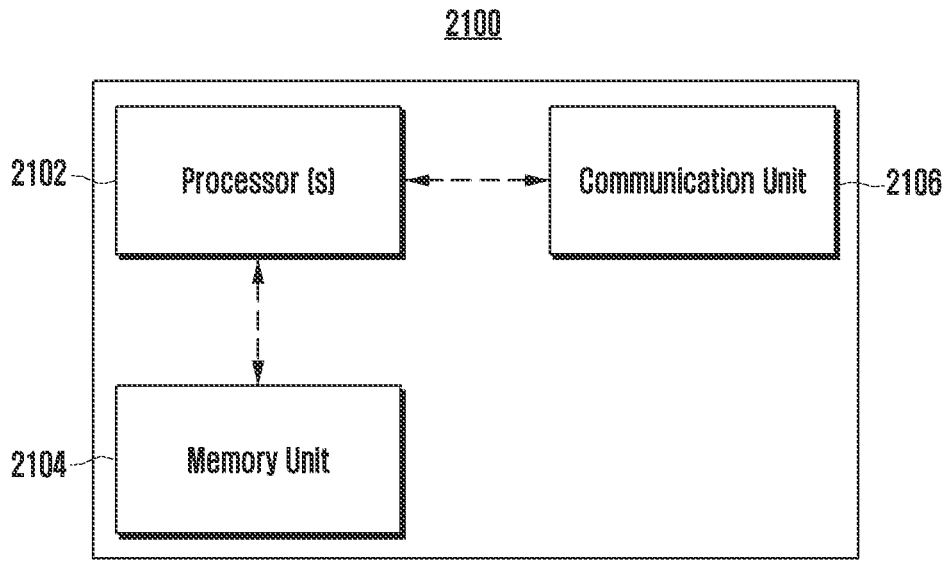
Figure 22:
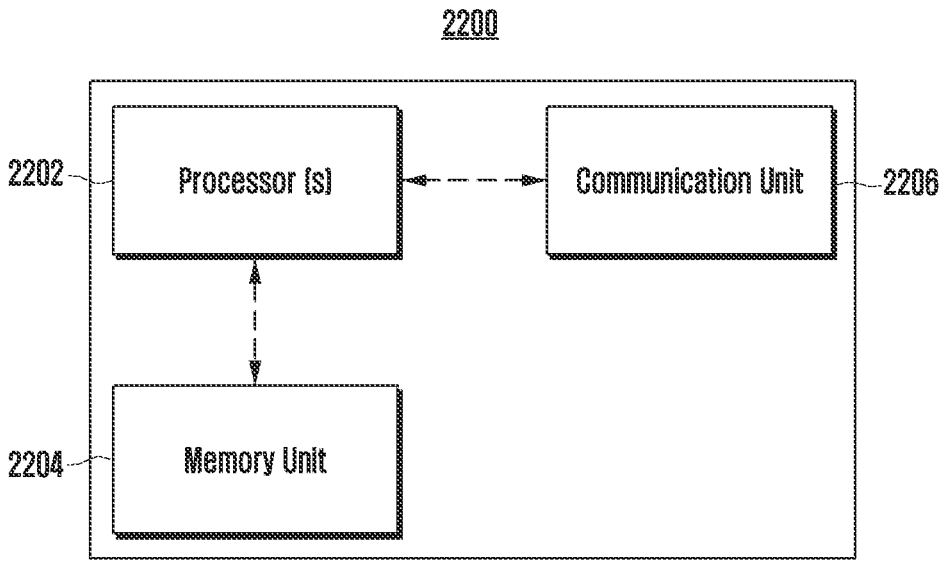

8 from the following description taken in conjunction with the accompanying drawings, in which:

FIG. 1A shows a flow diagram of Subscription Permanent Identifier (SUPI) concealment procedure at a User Equipment (UE) according to the related art;

FIG. 1B illustrates a schematic block diagram representing a replay attack in a wireless communication system according to the related art;

FIG. 2 illustrates a tree structure of solutions to preserve forward secrecy in a wireless communication system, according to an embodiment of the disclosure;

FIG. 3 illustrates a sequence of operation of a method for dynamic data encryption in a communication system via single key sharing using a secure channel, according to an embodiment of the disclosure;

FIG. 4 illustrates a sequence of operation of a method for registration for dynamic data encryption between a User Equipment (UE) and a Home Network (HN) via a single key sharing using a secure channel, according to an embodiment of the disclosure;

FIG. 5 illustrates a sequence of operation of a method for dynamic data encryption in a communication system via multiple key sharing using a secure channel, according to an embodiment of the disclosure;

FIG. 6 illustrates a sequence of operation of a method for registration for dynamic data encryption between a UE and an HN via multiple key sharing using a secure channel, according to an embodiment of the disclosure;

FIG. 7 illustrates a sequence of operation of a method for dynamic data encryption in a communication system via multiple key sharing using Subscriber Identity Module (SIM) provisioning, according to an embodiment of the disclosure;

FIG. 8 illustrates a sequence of operation of a method for registration for dynamic data encryption between a UE and an HN via multiple key sharing using SIM provisioning, according to an embodiment of the disclosure;

FIG. 9 illustrates a sequence of operation of a method for dynamic data encryption in a communication system via single key sharing using an in-secure channel, according to an embodiment of the disclosure;

FIG. 10 illustrates a sequence of operation of a method for registration for dynamic data encryption between a UE and an HN via a single key sharing using an in-secure channel, according to an embodiment of the disclosure;

FIG. 11 illustrates a sequence of operation of a method for the dynamic data encryption in a communication system via multiple key sharing using an in-secure channel, according to an embodiment of the disclosure;

FIG. 12 illustrates a sequence of operation of a method for registration for dynamic data encryption between a UE and an HN via multiple key sharing using an in-secure channel, according to an embodiment of the disclosure;

FIG. 13 illustrates a process flow depicting a method for dynamic data encryption in a wireless communication system by a UE, according to an embodiment of the disclosure;

FIG. 14 illustrates a process flow depicting a method for dynamic data encryption in a wireless communication system by a network entity, according to an embodiment of the disclosure;

FIG. 15 illustrates a process flow depicting a method dynamic data for dynamic data encryption in a wireless communication system by a UE, according to an embodiment of the disclosure;

FIG. 16 illustrates a process flow depicting a method dynamic data for dynamic data encryption in a wireless communication system by a network entity, according to an embodiment of the disclosure;

FIG. 17 illustrates a process flow depicting a method for dynamic data encryption in a wireless communication system by a UE, according to an embodiment of the disclosure;

FIG. 18 illustrates a process flow depicting a method for dynamic data encryption in a wireless communication system by a network entity, according to an embodiment of the disclosure;

FIG. 19 illustrates a process flow depicting a method for dynamic data encryption in a wireless communication system by a UE, according to an embodiment of the disclosure;

FIG. 20 illustrates a process flow depicting a method for dynamic data encryption in a wireless communication system by a network entity, according to an embodiment of the disclosure;

FIG. 21 illustrates diagram of a network, according to an embodiment of the disclosure; and FIG. 22 is a diagram illustrating a configuration of a UE in a wireless communication system, according to an embodiment of the disclosure.

Throughout the drawings like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In recent years, several broadband wireless technologies have been developed in order to meet the growing number of broadband subscribers for providing better applications and services. For example, a Second Generation (2G) wireless communication system was developed to provide voice services while ensuring the mobility of users. Similarly, a Third Generation (3G) wireless communication system was developed to support voice services as well as data services. Further, a Fourth Generation (4G) wireless communication system has been developed to provide high-speed data service. However, the 4G wireless communication system suffers from lack of resources to meet the growing demand for high-speed data services. This problem is solved by Fifth Generation (5G) wireless communication system, which provides ultra-reliability and supports low latency applications. However, the 5G wireless communication system fails to provide forward secrecy guarantee and is prone to replay attacks.

Particularly, the forward secrecy, also referred as perfect forward secrecy, is a feature of specific key agreement that gives assurance that shared keys will not be compromised even if private key or long-term secrets used in the shared key exchange are compromised.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

FIG. 1A shows a flow diagram of Subscription Permanent Identifier (SUPI) concealment procedure at a User Equipment (UE), according to the related art.

Referring to FIG. 1A, a SUPI concealment procedure at the UE based on Elliptical Curve based Integrated Encryption Scheme (ECIES) in fifth generation system (5G) is illustrated. The Home network (HN) generates a single public-private key for all sessions, which is not complaint to forward secrecy.

However, once the HN private key is compromised, all sessions data and communication are compromised, i.e., an attacker can intercept the Subscriber Permanent Identifier (SUPI) data and later replay said data back to a network. The network may mis-classify the data as a valid message and respond to the attacker. Therefore, the attacker may derive the sensitive information of a user such as user identity, location, etc.

FIG. 1B illustrates a schematic block diagram representing a replay attack in a wireless communication system, according to the related art.

Referring to FIG. 1B, the replay attach may also be referred to as a playback attach which is defined as a form of network attach in which valid data transmission is maliciously (or) fraudulently repeated (or) delayed by an adversary or attacker 106. In particular, the attacker 106 may intercept data sent by a sender 102 to a receiver 104, and playback or transmit the latter to the receiver 104. When the receiver 104 decodes the data received from the attacker 106, the receiver 104 may consider the data as valid data and respond with a valid response. Therefore, in response, the attacker 106 may receive sensitive information like a user identity, location etc. However, such replay attack scenarios were not considered while designing/implementing a 5G security system.

In sixth generation (6G) wireless communication system (6G), quantum computer or machines may be widely used which can become a threat for current wireless security systems. In particular, a quantum computer is a computer, which makes use of quantum-mechanical effects. These effects include superposition, which allow quantum bits (qubits) to exist in a combination of several states at once, and entanglement, which further allows connections between separate quantum systems such that they cannot be described independently. There exist quantum techniques that use these effects to solve certain cryptographic problems more efficiently than could be solved on a conventional computer. For example, shor's quantum algorithm for integer factorization runs in polynomial time on a quantum computer. A variant of Shor's algorithm enables the quantum computer to calculate discrete logarithms in polynomial time, both over finite fields and elliptic curves. This variant renders several other public-key cryptosystems insecure, including Diffie-Hellman (DH) and Elliptic Curve Diffie-Hellman (ECDH). To counter the threat of the quantum computing to asymmetric cryptography it is necessary to swap existing techniques for new, quantum-resistant algorithms also called Post Quantum Cryptography (PQC) techniques. There is a need for wireless communication networks including beyond Fifth Generation (5G), Sixth Generation (6G), to adapt to these PQC algorithms for enhanced security.

Specifically, there is a need to overcome the above-mentioned problems in the authentication and encryption procedure of the wireless communication systems. Specifically, there is a need to provide methods and systems that ensure perfect forward secrecy in the wireless communication systems.

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below in detail with reference to the accompanying drawings.

The terms "Home Network", "Network", "NW", "HN entity", "network entity", and "HN" correspond to a network and may be used interchangeably throughout the specification.

The embodiments herein achieve methods and systems for preserving perfect forward secrecy in both fifth generation (5G) and sixth generation (6G) wireless communication systems.

Specifically, embodiments herein relate to methods and systems for preserving perfect forward secrecy in 6G. Embodiments herein define a mechanism for generating and sharing cryptography keys (also referred as "keys") via both secure and insecure channel mechanisms. Embodiments herein define a mechanism for generating the key once per session and generating multiple keys for multiple sessions together. Crypto techniques as disclosed herein, refer to either legacy crypto technique or post quantum cryptography techniques (or) any hybrid technique. Post quantum based crypto technique are preferred to be safe against quantum attacks and for its faster key generation mechanism. Embodiments herein define a mechanism for signing keys using digital signature methods. In the disclosure, both legacy and post quantum based signing and verification of digital signatures may be considered.

The security and authentication mechanisms in beyond 5G wireless communication system are not maintaining forward secrecy. Present Subscriber Permanent Identifier (SUPI) concealment and Subscriber Concealed Identifier (SUCI) concealment procedures, which are based on Elliptical Curve based Integrated Encryption Scheme (ECIES), use the same Home Network (HN) public and private key pair throughout multiple sessions for each subscriber. An Attacker can store all the session information between the User Equipment (UE) and the HN and can later decrypt them on the HN private key (generated by the HN) being available. These type of attacks are also called SNDL (Store Now Decrypt Later) attacks. Preserving forward secrecy in 6G mitigates such kind of attacks.

The Attacker can also intercept the SUCI data and replay it back to the Network, thereafter the network may think it as a valid message and processes it. The Attacker can get responses back and derive sensitive information of user like user identity, location etc. These attacks are called replay attacks or playback attacks. Preserving forward secrecy will also help deal with and mitigate such replay attacks as keys keep on changing for each session, two or more entities of the wireless communication network that is protected against an unauthorized access, an interception, or tampering. The secure channel may ensure confidentiality, integrity, and authenticity of data transmitted over the channel. In some embodiments, various cryptographic protocols such as, but not limited to, Transport Layer Security (TLS), Wi-Fi Protected Access 3 (WPA3), and Virtual Private Networks (VPNs), may be employed to establish the secure channel among the entities of the wireless communication system. However, the insecure channel may refer to a communication path between the two or more entities of the wireless communication network that may not be deployed with the above-mentioned cryptographic protocols.

FIG. 2 illustrates a tree structure of solutions to preserve forward secrecy in a wireless communication system, according to an embodiment of the disclosure.

Referring to FIG. 2, in the secure channel, the forward secrecy process 200 may enable key sharing via a registration accept message, a N1 message, and/or any other Radio Resource Control (RRC) connection messages. Further, in the secure channel, the forward secrecy process 200 may implement key sharing during Subscriber Identity Module (SIM) provision in the UE. For the insecure channel, the forward secrecy process 200 may define a mechanism for signing keys using digital signature methods. The disclosure considers both conventional and post quantum based signing and verification of digital signatures.

Based on the proposed forward secrecy process 200, the disclosure enhances security in the wireless communication system by preventing attacks such as, replay attacks, Store-Now, Decrypt Later (SNDL) attacks, and rogue-base attacks.

FIG. 3 illustrates a sequence of operation of a method for dynamic data encryption in a wireless communication system via single key sharing using a secure channel, according to an embodiment of the disclosure.

Referring to FIG. 3, in a method 300, in a wireless communication system 301, the sequence of operation corresponds to a communication between a User Equipment (UE) 302 and a Home Network (HN) entity 304 (interchangeably referred as "the HN 304"). An example of the UE 302 includes a terminal, a mobile device, a tablet, a laptop, a personal computing device, or any other suitable communication device. Further, the HN 304 may be a Serving Network (SN) capable of communicating with the UE and supporting authentication and encryption procedure. In one embodiment, the UE 302 and the HN 304 may correspond to the wireless communication system 301.

At operation 306, the UE 302 may receive a temporary HN public key from the HN 304. In one embodiment, the temporary HN public key may be shared with the UE 302 during SIM provisioning. The temporary HN public key may refer to a network public key that is valid for a single session. At operation 308, the UE 302 may generate a UE public-private key pair including a UE public key and a UE private key. The UE public key may be used for encrypting data and the UE private key may be used decrypting the data. In some embodiments, the UE 302 may implement cryptographic techniques such as, but not limited to, Rivest-Shamir-Adleman (RSA), Elliptic Curve Cryptography (ECC), etc., to generate the UE public-private key pair.

Further, at operation 308, the UE 302 may generate a shared secret key corresponding to the UE 302 using the temporary HN public key and the UE private key. Furthermore, the UE 302 may share the UE public key with the HN 304.

At operation 310, the HN 304 may generate a shared secret key corresponding to the HN 304 using a temporary HN private key and the UE public key. In an embodiment, the shared secret key corresponding to the HN 304 may be same as the shared secret key corresponding to the UE 302. Further, the UE 302 may perform encryption/decryption of the data using the shared secret key corresponding to the UE 302 and the HN 304 may perform encryption/decryption of the data using the shared secret key corresponding to the HN 304. Next, the UE 302 and the HN 304 may perform the data transfer for the session using said encryption.

For the next communication session, at operation 312, the HN 304 may generate a temporary HN public-private key pair. The HN 304 may share the generated temporary HN public key via any secure communication message such as, but not limited to, NAS (N1) message, a RRC message (e.g., a registration accept message), and the like. In particular, when a secured communication channel is established between the UE 302 and the HN 304, the HN 304 may generate a new temporary HN public-private key pair and share the new temporary HN public key to the UE 302 for every new session.

At operation 314, the UE 302 may update/overwrite the temporary HN public key received during a previous session and/or SIM provisioning with the temporary HN public key received for a current session. Further, the UE 302 may generate an updated UE public-private key pair, and a shared secret key corresponding to the UE 302 using the updated UE private key and the temporary HN public key. Moreover, the UE 302 may share the updated UE public key with the HN 304.

At operation 316, the HN 304 may generate a shared secret key corresponding to the HN 304 using the temporary HN private key and the updated UE public key. Thereafter, encryption and sharing of the data is performed using the generated shared secret keys, as discussed above. In an embodiment, the encryption may be performed using any suitable symmetric technique (such as, Advanced Encryption Standard (AES)).

Thus, the method 300 provides a solution that involves generating a shared secret key for each session to enhance protection against the attackers. Specifically, if a key is compromised in one session, the data from other sessions may be protected thereby enhancing security of the communication.

FIG. 4 illustrates a sequence of operation of a method for registration for dynamic data encryption between a UE and an HN via a single key sharing using a secure channel, according to an embodiment of the disclosure. Operation 402 may correspond to SIM provisioning at the UE 302.

Referring to FIG. 4, in a method 400, at operation 402, the HN 304 may perform key generation to generate the temporary HN public-private key pair for a current session and share the temporary HN public key with the UE 302 during the SIM provisioning. The SIM provisioning may be defined as a process of configuring and activating a SIM card in the UE 302. The SIM provisioning may include processes such as, but not limited to, personalization, subscription activation, network configuration, authentication, and the like.

Next at operation 404, the UE 302 may transmit a registration request message to the HN 304. The registration request message may include the UE public key for the current session. Particularly, for operation 404, the UE 302 may generate the UE public-private key for the current session and share the UE public key with the HN 304.

Next at operation 406, the HN 304 may share a registration accept message to the UE 302. The HN 304 may transmit the registration accept message to the UE 302. The registration accept message may include a temporary HN public key, and index/identifiers for a next session. Further, the UE 302 may overwrite the previously stored temporary HN public key with the temporary HN public key received at operation 406. Thereafter, the UE 302 may perform similar operation(s) as performed at operation 404. The registration accept message may always include a new temporary HN public key Information Element (IE) for the next session. The new temporary HN public key may replace the previously stored HN public key at the UE 302. In one embodiment, the registration accept message include information as provided in below Table 1:

TABLE 1

| IEI | Information Element | Type/Reference | Presence | Format | Length |
|-----|---------------------|----------------|----------|--------|--------|
| XX | Temporary HN Public Key information | Temporary HN Public Key information 9.11.3.XX | O | TLV | 35-67 Bytes |

The temporary HN public key IE may include the temporary HN public key provided by the HN 304 to the UE 302. In one embodiment, the UE 302 may use the information provided in the registration accept message to complete authentication with the HN 304.

A configuration of the temporary HN public key IE may be represented as below Table 2:

TABLE 2

| 8 | 7 | 6 | 5 | 4 | 3 | 2 | 1 | |
|---|---|---|---|---|---|---|---|---|
| | Temporary HN Public Key information IEI | | | | | | | Octet 1 |
| | Length of Temporary HN Public Key information contents | | | | | | | Octet 2 |
| | Home network public key identifier | | | | | | | Octet 3 |
| | HN Public Key | | | | | | | Octet 4-35/67 |

In one embodiment, the temporary HN public key IE may have a length of 35 to 67 octets. Further, the HN network public key identifier may be used by the UE 302 to update an existing/previously stored HN public key. The HN network public key identifier may have a length of one octet and may be located at octet 3. Further, the HN public key provisioned by the HN 304 may be located from octet 4 to octet 35/67 based on the length of the temporary HN public key IE.

Further, the operation 408 that corresponds to registration request and operation 410 that corresponds to registration accept and are similar to operations 404 and 406, respectively may be performed for each communication session.

FIG. 5 illustrates a sequence of operation of a method for dynamic data encryption in a wireless communication system via multiple key sharing using a secure channel, according to an embodiment of the disclosure.

Referring to FIG. 5, in a method 500, the sequence of operation corresponds to the communication between the UE 302 and the HN 304. The operations 502-506 correspond to establishment of a secured communication channel between the UE 302 and the HN 304 using the temporary HN public key shared with UE 302 during the SIM provisioning. Further, the operations 502, 504, and 506 are similar to the operations 306, 308, and 310, as explained with reference to FIG. 3, therefore a description of the operations 502, 504, and 506 has been omitted for the sake of brevity.

At operation 508, the HN 304 may generate a list of temporary HN public-private key pairs include a list of temporary HN public keys and a corresponding list of temporary private keys. Further, the HN 304 may also generate a corresponding key index to each HN public-private key pair of the list of HN public-private key pairs. Furthermore, the HN 304 may share the generated list of temporary HN public keys along with corresponding key indexes with the UE 302 over the secured communication channel established via the operations 502-508. The list of temporary HN public keys may be shared (transmitted) via any secured messages such as, but not limited to, a N1 message, a RRC message, and the like.

At operation 510, the UE 302 may receive the list of temporary HN public keys along with corresponding key indexes via the secured communication channel. The UE 302 may update the previously stored HN public key with the received list of HN public keys. Further, the UE 302 may generate a UE public-private key pair include a UE public key and a UE private key for a current session. Next, the UE 302 may randomly select a HN public key from the received list of HN public keys. Thereafter, the UE 302 may generate a shared secret key corresponding to the UE 302 using the randomly selected temporary HN public key and the UE private key. The UE 302 may then transmit the UE public key and the key index corresponding to the randomly selected HN public key to the HN 304. At operation 512, the HN 304 may generate a shared secret key corresponding to the HN 304 using the HN private key corresponding to the randomly selected HN public key by the UE 302, and the UE public key. The HN 304 may perform a HN private key matching based on the received key index from the UE 302 to identify the HN private key corresponding to the randomly selected HN public key by the UE 302. In an embodiment, the shared secret key corresponding to the HN 304 may be same as the shared secret key corresponding to the UE 302. Further, the UE 302 may perform encryption/decryption of the data using the shared secret key corresponding to the UE 302 and the HN 304 may perform encryption/decryption of the data using the shared secret key corresponding to the HN 304.

Thereafter, for each of the next session, the UE 302 may randomly select one of the HN public key from the received list of HN public keys, and the UE 302 and the HN 304 may generate the corresponding shared secret keys as explained in the operation 510 and the operation 512. In another embodiment, the UE 302 may receive a new list of HN public keys from the HN 304 for every new session.

FIG. 6 illustrates a sequence of operation of a method for registration for dynamic data encryption between a UE and an HN via multiple key sharing using a secure channel, according to an embodiment of the disclosure.

Referring to FIG. 6, in a method 600, operation 602 may correspond to SIM provisioning at the UE 302. In particular, at operation 602, the HN 304 may perform key generation to generate a temporary HN public-private key pair for a current session and share the temporary HN public key with the UE 302 during the SIM provisioning.

Next at operation 604, the UE 302 may transmit a registration request message to the HN 304. The registration request message may include the UE public key for the current session. Particularly, for the operation 604, the UE 302 may generate the UE public-private key for the current session and share the UE public key with the HN 304. Next at operation 606, the HN 304 may share a registration accept message to the UE 302. The registration accept message may include the list of temporary HN public keys along with corresponding key indexes/identifiers for next sessions. In particular, for the operation 606, the HN 304 may perform multiple key generation to generate the list of public-private key pairs. Further, the UE 302 may overwrite the previously stored temporary HN public key with the received list of temporary HN public keys. In this scenario, the registration accept message may include a Temporary HN Public Key List IE for the list of temporary HN public keys. The list of temporary HN public keys may replace the previously stored HN public key at the UE 302. In one embodiment, the registration accept message include information as provided in below Table 3:

TABLE 3

| IEI | Information Element | Type/Reference | Presence | Format | Length |
|-----|---------------------|----------------|----------|--------|--------|
| XX | Temporary HN Public Key information List | Temporary HN Public Key information 9.11.3.XX | O | TLV | 35-67 Bytes |

The temporary HN public key IE may include the list of temporary HN public keys provided by the HN 304 to the UE 302. In one embodiment, the UE 302 may use the information provided in the registration accept message to complete authentication with the HN 304.

A configuration of the temporary HN public key list IE may be represented as below Table 4:

TABLE 4

| 8 | 7 | 6 | 5 | 4 | 3 | 2 | 1 | |
|---|---|---|---|---|---|---|---|---|
| Temporary HN Public Key information list IEI | | | | | | | | Octet 1 |
| Length of Temporary HN Public Key information contents | | | | | | | | Octet 2 |
| Home network public key identifier 1 | | | | | | | | Octet 3 |
| HN Public Key 1 | | | | | | | | Octet 4-35/67 |
| . . . | | | | | | | | |
| HN Public Key identifier n | | | | | | | | |
| HN Public Key n | | | | | | | | |

In one embodiment, the temporary HN public key IE may have a length of 2+(n×32/64 octets), n may correspond to a number of keys in the list of temporary HN public keys.

Thereafter, at operation 608, the UE 302 may randomly select a temporary HN public key from the list of temporary HN public keys to generate the shared secret key. Further, the UE 302 may transmit a registration request message for the next session. The registration request message may include a UE public key and a key index corresponding to the randomly selected HN public key.

Next, at operation 610, the HN 304 may transmit a registration accept message with a new list of the temporary HN public keys. In one embodiment, the new list of temporary HN public keys may be same as the previously shared list of the temporary HN public keys. In another embodiment, the new list of temporary HN public keys may be based on updated temporary HN public-private key pairs. In some embodiments, the new list of temporary HN public keys may not include any of the HN public keys that has been previously selected by the UE 302 randomly.

FIG. 7 illustrates a sequence of operation of a method for dynamic data encryption in a communication system via multiple key sharing using SIM provisioning, according to an embodiment of the disclosure.

Referring to FIG. 7, in a method 700, at operation 702, the HN 304 may perform the multiple key generation to generate the list of temporary HN public-private key pairs and provision the generated list of temporary HN public key at the UE 302 during SIM provision.

Next, at operation 704, the UE 302 may generate a UE public-private key pair. Further, the UE 302 may randomly select a temporary HN public key from the list of temporary HN public keys to generate the shared secret key. Further, the UE 302 may transmit the UE public key and a key index corresponding to the randomly selected HN public key.

At operation 706, the HN 304 may generate the shared secret key using the temporary HN private key and the received UE public key. In one embodiment, the HN 304 may identify the temporary HN private key based on the received key index corresponding to the randomly selected HN public key by the UE 302.

Thereafter, the UE 302 and the HN 304 may perform data transfer using encryption via the generated shared secret keys.

FIG. 8 illustrates a sequence of operation of a method for registration for dynamic data encryption between a UE and an HN via multiple key sharing using SIM provisioning, according to an embodiment of the disclosure.

Referring to FIG. 8, in a method 800, operation 802 may correspond to SIM provisioning at the UE 302. In particular, at operation 802, the HN 304 may perform multiple key generation to generate a list temporary HN public-private key pairs and share the list of temporary HN public keys with the UE 302 during the SIM provisioning.

Next at operation 804, the UE 302 may transmit a registration request message to the HN 304. The registration request message may include the UE public key for the current session, and the key index corresponding to the randomly selected HN public key. Specifically, the UE 302 may randomly select a temporary HN public key from the list of temporary HN public keys to generate the shared secret key and share the key index of the randomly selected temporary HN public key in the registration request message.

At operation 806, the HN 304 may transmit the registration accept message. The HN 304 may identify the temporary HN private key using the key index matching with the list of the temporary HN public-private key pairs. The HN 304 may use the identified temporary HN private key to generate the shared secret key for the data encryption. Further, for every new session, the operations 804 and 806 may be performed.

In one embodiment, to implement the method 700 and/or the method 800, a new EF PFS_KEY_INFO (4FXX) data object may be added to the SIM. In other embodiment, an existing EF_SUCI_CALC_INFO data object may be modified to accommodate multiple keys for each protection scheme identifier.

In an embodiment, the following modification (as represented by Table 5) may be incorporated in 3GPP TS 31.102

TABLE 5

| Identifier: '4FXX' | Structure: transparent | Optional |
| --- | --- | --- |
| SFI: 'XX' | | |
| File size: X bytes (X ≥ 2) | Update activity: low | |
| Access Conditions: | | |
| READ PIN | | |
| UPDATE ADM | | |
| DEACTIVATE ADM | | |
| ACTIVATE ADM | | |

| Bytes | Description | M/O | Length |
| --- | --- | --- | --- |
| 1 to Z | PFS Protection Scheme Key Identifier List data object | M | Z bytes |
| Z + 1 to Y + Z | Home Network Public Key List data object | C | Y bytes |

Forward Secrecy (PFS) Protection Scheme Key Identifier List data object length is not zero, the data object contains a list of the PFS Protection Scheme Key identifiers and the corresponding key index. The first PFS Protection Scheme Identifier entry has the highest priority, and the last PFS Protection Scheme Identifier entry has the lowest priority. The Key Index value indicates the position of the Home Network Public Key in the Home Network Public Key List, that is applicable to the PFS Protection Scheme.

FIG. 9 illustrates a sequence of operation of a method for dynamic data encryption in a communication system via single key sharing using an in-secure channel, according to an embodiment of the disclosure.

Referring to FIG. 9, in a method 900, at operation 902, the HN 304 may generate a digital certificate public key and share the generated digital certificate public key with the UE 302. In one embodiment, the HN 304 may generate the digital certificate public key using techniques such as, but not limited to, Elliptic Curve Digital Signature Algorithm (ECDSA), Rivest-Shamir-Adleman (RSA), or post quantum based algorithms like Di-lithium etc. In some embodiments, the HN 304 may share the digital certificate public key with the UE 302 during SIM provisioning.

At operation 904, the UE 302 may generate a random number (R) and share the random number (R) with the HN 304. In an embodiment, the UE 302 may generate the random number (R) to initiate a session with the HN 304 and/or enable the HN 304 to generate the required keys.

At operation 906, the HN 304 may generate a temporary HN public-private key pair, signs the HN public key and the random number (R) using the digital certificate private key and shares the signed temporary HN public key to the UE 302. In an embodiment, the temporary HN public key is different for each session. Further, addition of the random number (R) may prevent replay attacks. Further, the HN 304 may share the temporary HN public key signed with digital certificate private key to the UE 302.

At operation 908, the UE 302 may verify the temporary HN public key using HN digital certificate public key. Next, the UE 302 may generate the UE public-private key pair. Also, the UE 302 may generate a shared secret key corresponding to the UE 302 using the HN public key and the UE private key. Thereafter, the UE 302 may share the UE public key with the HN 304.

At operation 910, the HN 304 may generate a shared secret key corresponding to the HN 304 using the temporary HN private key and the UE public key.

Thereafter, the UE 302 and the HN 304 may perform data transfer using encryption via the generated shared secret keys.

FIG. 10 illustrates a sequence of operation of a method for registration for the dynamic data encryption between a UE and an HN via a single key sharing using an in-secure channel, according to an embodiment of the disclosure.

Referring to FIG. 10, in a method 1000, the HN 304 may include a Security Anchor Function (SEAF) 1002, an Authentication Server Function (AUSF) 1004, and a Unified Data Management (UDM) 1006. The SEAF 1002 may be configured to provide secure communication between the UE 302 and the HN 304. The AUSF may be configured to perform authentication and key generation functions, to establish a secure connection between the UE 302 and the HN 304. The UDM 1006 may be configured to manage user-related data and subscription information of the user at the HN 304.

The UE 302 may be provisioned with the HN digital certificate/HN digital certificate public key. At operation 1008, the UE 302 may generate and share a random number with the SEAF 1002. At operation 1010, the SEAF 1002 may share the random number with the AUSF 1004. Thereafter, the AUSF 1004 may share the random number with the UDM 1006. In response, the HN 304 may perform key generation and signing process i.e., the HN 304 may generate a temporary HN public-private key pair and sign the HN public with the HN digital certificate (also referred as signature). At operation 1014, the UDM 1006 may share the temporary HN public key with the signature to the AUSF 1004. At operation 1016, the AUSF 1004 may share the temporary HN public key with the signature to the SEAF 1002. Thereafter, the SEAF 1002 may share the temporary HN public key and signature with the UE 302, at operation 1018. The UE 302 may verify the temporary HN public key using the provision HN digital certificate/HN digital certificate public key. Further, the UE 302 may use the temporary HN public key to generate the shared secret key corresponding to the UE 302. Also, the UE 302 may generate a UE public-private key pair. At operation 1020, the UE 302 may share the generated UE public key with the SEAF 1002. At operation 1022, the SEAF 1002 may share the UE public key with the AUSF 1004. At operation 1024, the AUSF 1004 may share the UE public key with the UDM 1006. In response, the HN 304 may generate the shared secret key using the received UE public key and the temporary HN private key.

In one embodiment, to implement the method 900 and/or the method 1000, a new EF PFS_KEY_INFO (4FXX) data object may be added to the USIM.

In an embodiment, the following modification (as represented by Table 6) may be incorporated in 3GPP TS 31.102

TABLE 6

| Description | Value | M/O/C | Length (bytes) |
| --- | --- | --- | --- |
| PFS Protection Scheme Identifier data object tag | 'A0' | M | 1 |
| PFS Protection Scheme Identifier data object length | L1 | M | Note 1 |
| Protection Scheme Identifier | — | O | 1 |
| Digital Signature 1 | — | C (Note 2) | L |
| Protection Scheme Identifier 2 | — | O | 1 |
| Digital Signature 2 | — | C (Note 2) | L |
| . . . | . . . | . . . | . . . |

TABLE 6-continued

| Description | Value | M/O/C | Length (bytes) |
|---|---|---|---|
| Protection Scheme Identifier N | — | O | 1 |
| Digital Signature N | — | C (Note 2) | L |

Note 1:
The length is coded according to ISO/IEC 8825-1 [35]
Note 2:
This field is present only if the corresponding Protection Scheme Identifier field is present The data object (as represented by Table 6) shall always be present in the UE. If the PFS Protection Scheme Key Identifier List data object length is not zero, the data object contains a list of the PFS Protection Scheme Key identifiers referring to the digital signature based protection scheme and the corresponding Digital Signature of length L octets. The first PFS Protection Scheme Identifier entry has the highest priority, and the last PFS Protection Scheme Identifier entry has the lowest priority.

FIG. 11 illustrates a sequence of operation of a method for dynamic data encryption in a communication system via multiple key sharing using an in-secure channel, according to an embodiment of the disclosure.

Referring to FIG. 11, in a method 1100, at operation 1102, the HN 304 may generate a digital certificate public key and share the generated digital certificate public key with the UE 302. In one embodiment, the HN 304 may generate the digital certificate public key using techniques such as, but not limited to, Elliptic Curve Digital Signature Algorithm (ECDSA), Rivest-Shamir-Adleman (RSA), or post quantum based algorithms like Di-lithium etc. In some embodiments, the HN 304 may share the digital certificate public key with the UE 302 during SIM provisioning.

At operation 1104, the UE 302 may generate a random number (R) and share the random number (R) with the HN 304. In an embodiment, the UE 302 may generate the random number (R) to initiate a session with the HN 304 and/or enable the HN 304 to generate the required keys.

At operation 1106, the HN 304 may generate a list of temporary HN public-private key pairs, signs the list of HN public keys and the random number (R) using the digital certificate private key. The HN 304 may then share the signed list of temporary HN public keys to the UE 302. The addition of the random number (R) may prevent replay attacks.

At operation 1108, the UE 302 may verify the list of temporary HN public keys using the provisioned HN digital certificate public key. Next, the UE 302 may generate the UE public-private key pair. Also, the UE 302 may randomly select a HN public key from the list of the temporary HN public keys to generate a shared secret key corresponding to the UE 302 using the selected HN public key and the UE private key. Thereafter, the UE 302 may share the UE public key and a key index corresponding to the selected temporary HN public key with the HN 304. The UE 302 may transmit the UE public key and a key index corresponding to the selected temporary HN public key with the HN 304.

At operation 110, the HN 304 may generate a shared secret key corresponding to the HN 304 using the temporary HN private key corresponding to the randomly selected HN public key and the UE public key.

Thereafter, the UE 302 and the HN 304 may perform data transfer using encryption via the generated shared secret keys.

FIG. 12 illustrates a sequence of operation of a method for registration for a dynamic data encryption between a UE and an HN via multiple key sharing using an in-secure channel, according to an embodiment of the disclosure.

Referring to FIG. 12, in a method 1200, the HN 304 may include a Security Anchor Function (SEAF) 1202, an Authentication Server Function (AUSF) 1204, and a Unified Data Management (UDM) 1206 which are similar to the SEAF 1002, the AUSF 1004, and the UDM 1006, as explained in reference to FIG. 10.

The UE 302 may be provisioned with the HN digital certificate/HN digital certificate public key. At operation 1208, the UE 302 may generate and share a random number with the SEAF 1202. At operation 1210, the SEAF 1202 may share (e.g., transmit) the random number with the AUSF 1204. Thereafter, the AUSF 1204 may share the random number with the UDM 1206. In response, the HN 304 may perform multiple key generation and signing process, i.e., the HN 304 may generate a list of temporary HN public-private key pairs and sign the list of HN public keys with the HN digital certificate (also referred as signature). At operation 1214, the UDM 1006 may share the list of temporary HN public keys with the signature to the AUSF 1204. At operation 1216, the AUSF 1204 may share the list of temporary HN public keys with the signature to the SEAF 1202. Thereafter, the SEAF 1202 may share the list of temporary HN public keys and signature with the UE 302, at operation 1218. The UE 302 may verify the list of temporary HN public keys using the provisioned HN digital certificate/HN digital certificate public key. Further, the UE 302 may randomly select a temporary HN public key from the list of HN temporary HN public keys to generate the shared secret key corresponding to the UE 302. Also, the UE 302 may generate a UE public-private key pair. At operation 1220, the UE 302 may share the generated UE public key and a key index corresponding to the randomly selected HN temporary public key with the SEAF 1202. At operation 1222, the SEAF 1202 may share the UE public key and the key index with the AUSF 1204. At operation 1224, the AUSF 1004 may share the UE public key and the key index with the UDM 1006. In response, the HN 304 may generate the shared secret key using the received UE public key and a temporary HN private key corresponding to the randomly selected temporary HN public key by the UE 302.

In one embodiment, to implement the method 1100 and/or the method 1200, a new EF PFS_KEY_INFO (4FXX) data object may be added to the USIM.

In an embodiment, the following modification (as represented by Table 7) may be incorporated in 3GPP TS 31.102

TABLE 7

| Description | Value | M/O/C | Length (bytes) |
|---|---|---|---|
| PFS Protection Scheme Identifier data object tag | 'A0' | M | 1 |
| PFS Protection Scheme Identifier data object length | L1 | M | Note 1 |
| Protection Scheme Identifier | — | O | 1 |
| Digital Signature 1 | — | C (Note 2) | L |
| Protection Scheme Identifier 2 | — | O | 1 |
| Digital Signature 2 | — | C (Note 2) | L |
| . . . | . . . | | . . . |
| Protection Scheme Identifier N | — | O | 1 |
| Digital Signature N | — | C (Note 2) | L |

Note 1:
The length is coded according to ISO/IEC 8825-1 [35]
Note 2:
This field is present only if the corresponding Protection Scheme Identifier field is present The data object (as represented by Table 5) shall always be present in the UE. If the PFS Protection Scheme Key Identifier List data object length is not zero, the data object contains a list of the PFS Protection Scheme Key identifiers referring to the digital signature based protection scheme and the corresponding Digital Signature of length L octets. The first PFS Protection Scheme Identifier entry has the highest priority, and the last PFS Protection Scheme Identifier entry has the lowest priority.

FIG. 13 illustrates an process flow depicting a method for dynamic data encryption in a wireless communication system by a UE, according to an embodiment of the disclosure.

Referring to FIG. 13, in a method 1300, at operation 1302, the method 1300 includes receiving a list of network public keys including a plurality of network public keys and corresponding key indexes. In one embodiment, the UE 302 may receive the list of network public keys over one of a secured communication channel or an unsecured communication channel. Further, for receiving the list of network public keys over the secured communication channel, the method 1300 may include, establishing a Radio Resource Control (RRC) channel with the network entity 304. The method 1300 may further include receiving, from the network entity 304, the list of network public keys using at least one of a registration accept message, an N1 message, and an RRC connection message. For receiving the list of network public keys over the unsecure channel, the method 1300 may include receiving, from the network entity 304, the list of network public keys signed with a digital signature using a network private key. The UE 302 may receive the list of network public keys including a plurality of network public keys and corresponding key indexes from the network entity 304. Next, at operation 1304, the method 1300 includes generating a pair of keys including a UE public key and a UE private key in response to receiving the list of network public keys.

At operation 1306, the method 1300 includes randomly selecting a network public key from the list of network public keys received from the network entity 304. At operation 1308, the method 1300 includes generating a shared secret key corresponding to the UE 302 by using the randomly selected network public key and the UE private key. Thereafter, at operation 1310, the method 1300 includes encrypting the data to be transferred between the UE 302 and the network entity 304 by using the generated shared secret key corresponding to the UE 302. The method 1300 may also include transmitting, to the network entity 304, the UE public key and a key index corresponding to the randomly selected network public key for enabling the network entity to generate a shared secret key corresponding to the network entity using the UE public key and the key index corresponding to the randomly selected network public key.

In one embodiment, the data to be transferred between the UE and the network entity corresponds to a Subscription Permanent Identifier (SUPI). Also, the list of network keys may correspond to a list of temporary public keys of network provided during Subscriber Identity Module (SIM) provisioning.

Embodiments are in nature and the operations of the method 1300 as shown in FIG. 13 may occur in variations to the sequence in accordance with various embodiments. The variation may include addition and/or omission of operations illustrated in FIG. 13.

FIG. 14 illustrates an process flow depicting a method for dynamic data encryption in a wireless communication system by a network entity, according to an embodiment of the disclosure.

Referring to FIG. 14, in a method 1400, at operation 1402, the method 1400 includes transmitting, to the UE 302, a list of network public keys including a plurality of network public keys and corresponding key indexes. In one embodiment, the list of network public keys is transmitted over one of a secured communication channel or an unsecured communication channel. Further, for transmitting the list of network public keys over the secured communication channel, the method 1400 may include, establishing a Radio Resource Control (RRC) channel with the UE 302. The method 1400 may further include transmitting, to the UE 302, the list of network public keys using at least one of a registration accept message, an N1 message, and an RRC connection message. For transmitting the list of network public keys over the unsecure channel, the method 1400 may include signing the list of network public keys with a digital signature using a network private key. Further, the method 1400 may include transmitting, to the UE 302, the list of network public keys signed with the digital signature using the network private key. Next, at operation 1404, the method 1400 includes receiving, from the UE 302, a UE public key and a key index corresponding to a randomly selected network public key in response to the transmitted list of network public keys.

At operation 1406, the method 1400 includes generating a shared secret key corresponding to the network entity 304 using the UE public key and the key index corresponding to the randomly selected network public key. Next, at operation 1408, the method 1400 includes encrypting the data to be transferred between the UE 302 and the network entity 304 by using the generated shared secret keys corresponding to the network entity 304. In one embodiment, the data to be transferred between the UE 302 and the network entity 304 corresponds to a SUPI.

Embodiments are in nature and the operations of the method 1400 as shown in FIG. 14 may occur in variations to the sequence in accordance with various embodiments. The variation may include addition and/or omission of operations illustrated in FIG. 14.

FIG. 15 illustrates a process flow depicting a method for dynamic data for dynamic data encryption in a wireless communication system by a UE, according to an embodiment of the disclosure.

Referring to FIG. 15, in a method 1500, at operation 1502, the method 1500 includes receiving a temporary network public key from the network entity 304. In one embodiment, the temporary network public key is received from the network entity 304 in a registration accept message in response to an acceptance of a Radio Resource Control (RRC) connection request by the network entity 304. At operation 1504, the method 1500 includes generating a pair of keys including a UE public key and a UE private key in response to the received temporary network public key. Next, at operation 1506, the method 1500 includes generating a shared secret key corresponding to the UE 302 based on the received temporary network public key and the generated UE private key. Thereafter, at operation 1508, the method 1500 includes encrypting the data to be transferred between the UE 302 and the network entity 304 by using the generated shared secret keys corresponding to the UE 302. The method 1500 may also include transmitting, to the network entity 304, the UE public key for enabling the network entity 304 to generate a shared secret key corresponding to the network entity 304 using the UE public key.

Embodiments are in nature and the operations of the method 1500 as shown in FIG. 15 may occur in variations to the sequence in accordance with various embodiments.

The variation may include addition and/or omission of operations illustrated in FIG. 15.

FIG. 16 illustrates a process flow depicting a method for dynamic data for dynamic data encryption in a wireless communication system by a network entity, according to an embodiment of the disclosure.

Referring to FIG. 16, in a method 1600, at operation 1602, the method 1600 includes transmitting, to the UE 302, a temporary network public key. In one embodiment, the temporary network public key is transmitted to the UE 302 in a registration accept message in response to an acceptance of a Radio Resource Control (RRC) connection request from the UE 302. At operation 1604, the method 1600 includes receiving, from the UE 302, a UE public key in response to the transmitted temporary network public key. Next, at operation 1606, the method 1600 includes generating a shared secret key corresponding to the network entity 304 using the received UE public key. Thereafter, at operation 1608, the method 1600 includes encrypting the data to be transferred between the UE 302 and the network entity 304 by using the generated shared secret keys corresponding to the network entity 304.

Embodiments are in nature and the operations of the method 1600 as shown in FIG. 16 may occur in variations to the sequence in accordance with various embodiments. The variation may include addition and/or omission of operations illustrated in FIG. 16.

FIG. 17 illustrates a process flow depicting a method for dynamic data encryption in a wireless communication system by a UE, according to an embodiment of the disclosure.

Referring to FIG. 17, in a method 1700, At operation 1702, the method 1700 includes receiving a digital signature public key from the network entity 304. At operation 1704, the method 1700 includes transmitting, to the network entity 304, a random number to initialize a session with the network entity 304 in response to the received digital signature public key. Next at operation 1706, the method 1700 includes receiving a network public key and the random number signed with the digital signature public key from the network entity 304. At operation 1708, the method 1700 includes validating the digital signature public key used for signing the network public key. At operation 1710, the method 1700 includes generating a pair of keys including a UE public key and a UE private key upon successful validation of the digital signature public key.

Next, at operation 1712, the method 1700 includes generating a shared secret key corresponding to the UE by using the network public key and the UE private key. At operation 1714, the method 1700 includes encrypting the data to be transferred between the UE 302 and the network entity 304 by using the generated shared secret keys corresponding to the UE 302. The method 1700 may also include transmitting, to the network entity 304, the UE public key for enabling the network entity 304 to generate a shared secret key corresponding to the network entity. In one embodiment, the method 1700 may include transmitting the generated random number to the network entity 304 using at least one of a registration accept message, an N1 message, and an RRC connection message.

Embodiments are in nature and the operations of the method 1700 as shown in FIG. 17 may occur in variations to the sequence in accordance with various embodiments. The variation may include addition and/or omission of operations illustrated in FIG. 17.

FIG. 18 illustrates a process flow depicting a method for dynamic data encryption in a wireless communication system by a network entity, according to an embodiment of the disclosure.

Referring to FIG. 18, in a method 1800, at operation 1802, the method 1800 includes transmitting, to the UE 302, a digital signature public key. At operation 1804, the method 1800 includes receiving, from the UE 302, a random number in response to the transmitted digital signature public key. Next at operation 1806, the method 1800 includes transmitting, to the UE 302, a network public key and the random number signed with a digital signature public key. At operation 1808, the method 1800 includes receiving, from the UE 302, a UE public key in response to the transmitted network public key and the random number.

Next, at operation 1810, the method 1800 includes generating a shared secret key corresponding to the network entity 304 using the received UE public key. Further, at operation 1812, the method 1800 includes encrypting the data to be transferred between the UE 302 and the network entity 304 by using the generated shared secret keys corresponding to the network entity 304. In one embodiment, the method 1800 may include receiving the generated random number from the UE 302 using at least one of a registration accept message, an N1 message, and an RRC connection message.

Embodiments are in nature and the operations of the method 1800 as shown in FIG. 18 may occur in variations to the sequence in accordance with various embodiments. The variation may include addition and/or omission of operations illustrated in FIG. 18.

FIG. 19 illustrates a process flow depicting a method for dynamic data encryption in a wireless communication system by a UE, according to an embodiment of the disclosure.

Referring to FIG. 19, in a method 1900, at operation 1902, the method 1900 includes receiving a digital signature public key from the network entity 304. Next, at operation 1904, the method 1900 includes generating a random number to initialize a session with the network entity in response to the received digital signature public key. Thereafter, at operation 1906, the method 1900 includes receiving a list of network public keys signed with the digital signature public key from the network entity 304. The list of network public keys includes a plurality of network public keys and corresponding key indexes. At operation 1908, the method 1900 includes validating the digital signature public key used for signing the list of network public keys. At operation 1910, the method 1900 includes generating a pair of keys including a UE public key and a UE private key in response to successful validation of the digital signature public key. Next at operation 1912, the method 1900 includes randomly selecting, by the UE 302, a network public key from the list of network public keys received from the network entity 304. At operation 1914, the method 1900 includes generating a shared secret key corresponding to the UE 302 by using the randomly selected network public key and the UE private key. Lastly, at operation 1916, the method 1900 includes encrypting the data to be transferred between the UE 302 and the network entity 304 by using the generated shared secret keys corresponding to the UE 302 and/or the received shared secret keys corresponding to network entity 304. The method 1900 may also include transmitting, to the network entity 304, the UE public key and a key index corresponding the randomly selected network public key for enabling the network entity to generate a shared secret key corresponding to the network entity 304 using the UE public key and the key index.

Embodiments are in nature and the operations of the method 1900 as shown in FIG. 19 may occur in variations to the sequence in accordance with various embodiments. The variation may include addition and/or omission of operations illustrated in FIG. 19.

FIG. 20 illustrates a process flow depicting a method for dynamic data encryption in a wireless communication system by a network entity, according to an embodiment of the disclosure.

Referring to FIG. 20, in a method 2000, at operation 2002, the method 2000 includes transmitting, to the UE 302, a digital signature public key. At operation 2004, the method 2000 includes receiving, from the UE 302, a random number in response to the transmitted digital signature public key. Next at operation 2006, the method 2000 includes transmitting, to the UE 302, a list of network public keys and the random number signed with the digital signature public key in response to the received random number. The list of network public keys includes a plurality of network public keys and corresponding key indexes.

Thereafter, at operation 2008, the method 2000 includes receiving, from the UE 302, a UE public key and a key index corresponding a randomly selected network public key in response to the transmitted list of network public keys. At operation 2010, the method 2000 includes generating a shared secret key corresponding to the network entity using the UE public key and the key index. Next, at operation 2012, the method 2000 includes encrypting the data to be transferred between the UE 302 and the network entity 304 by using the generated shared secret keys corresponding to the network entity 304.

In one embodiment, the data to be transferred between the UE 302 and the network entity 304 corresponds to the SUPI.

Embodiments are in nature and the operations of the method 2000 as shown in FIG. 20 may occur in variations to the sequence in accordance with various embodiments. The variation may include addition and/or omission of operations illustrated in FIG. 20.

FIG. 21 illustrates a diagram of a network and/or a network entity, according to an embodiment of the disclosure.

Referring to FIG. 21, in a method 2100, the network and/or the network entity 2100 may correspond to the HN 304, as discussed throughout this disclosure. In one embodiment, the network entity 2100 may implement the methods 1400, 1600, 1800, and 2000 as explained above. The network entity 2100 may include at least one processor 2102, a memory unit 2104 (e.g., storage), and a communication unit 2106 (e.g., communicator, communication interface or transceiver). Further, the network entity 2100 may also include the Cloud-RAN (C-RAN), a Central Unit (CU), a core Network (NW), a Distributed unit (DU) or the any other possible network (NW) entity. The communication unit 2106 may perform one or more functions for transmitting and receiving signals via a wireless channel.

As an example, the processor 2102 may be a single processing unit or a number of units, all of which could include multiple computing units. The processor 2102 may be implemented as one or more microprocessors, microcomputers, microcontrollers, digital signal processors, central processing units, state machines, logic circuitries, and/or any devices that manipulate signals based on operational instructions. Among other capabilities, the processor 2102 is configured to fetch and execute computer-readable instructions and data stored in the memory unit 2104. The processor 2102 may include one or a plurality of processors. At this time, one or a plurality of processors 2102 may be a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial Intelligence (AI)-dedicated processor such as a Neural Processing Unit (NPU). The one or a plurality of processors 2102 may control the processing of the input data in accordance with a predefined operating rule or AI model stored in the non-volatile memory and the volatile memory, i.e., the memory unit 2104. The predefined operating rule or AI model is provided through training or learning.

The memory unit 2104 may include any non-transitory computer-readable medium known in the art including, for example, volatile memory, such as Static Random Access Memory (SRAM) and Dynamic Random Access Memory (DRAM), and/or non-volatile memory, such as Read-Only Memory (ROM), erasable programmable ROM, flash memories, hard disks, optical disks, and magnetic tapes.

FIG. 22 is a diagram illustrating a configuration of a UE in a wireless communication system, according to an embodiment of the disclosure.

Referring to FIG. 22, the configuration may be understood as a part of the configuration of a UE 2200. Further, the method as disclosed above may be implemented in the UE 2200 according to a further embodiment. In an embodiment, the UE 2200 corresponds to the UE 302. In one embodiment, the UE 2200 may implement the methods 1300, 1500, 1700, and 1900 as explained above. Hereinafter, it is understood that terms including "unit" or "module" at the end may refer to the unit for processing at least one function or operation and may be implemented in hardware, software, or a combination of hardware and software.

Referring to FIG. 22, the UE 2200 may include at least one processor 2202, a communication unit 2206 (e.g., communicator or communication interface), and a memory unit 2204 (also referred to as "the memory 2204"). By way of example, the UE 2200 may be a User Equipment, such as a cellular phone or other device that communicates over a plurality of cellular networks (such as a 3G, 4G, a 5G or pre-5G, 6G network or any future wireless communication network). The communication unit 2206 may perform functions for transmitting and receiving signals via a wireless channel.

As an example, the processor 2202 may be a single processing unit or a number of units, all of which could include multiple computing units. The processor 2202 may be implemented as one or more microprocessors, microcomputers, microcontrollers, digital signal processors, central processing units, state machines, logic circuitries, and/or any devices that manipulate signals based on operational instructions. Among other capabilities, the processor 2202 is configured to fetch and execute computer-readable instructions and data stored in the memory unit 2204. The processor 2202 may include one or a plurality of processors. At this time, one or a plurality of processors 2202 may be a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial Intelligence (AI)-dedicated processor such as a Neural Processing Unit (NPU). The one or a plurality of processors 2202 may control the processing of the input data in accordance with a predefined operating rule or AI model stored in the non-volatile memory and the volatile memory, i.e., memory unit 2204. The predefined operating rule or AI model is provided through training or learning.

The memory unit 2204 may include any non-transitory computer-readable medium known in the art including, for example, volatile memory, such as Static Random Access Memory (SRAM) and Dynamic Random Access Memory (DRAM), and/or non-volatile memory, such as Read-Only Memory (ROM), erasable programmable ROM, flash memories, hard disks, optical disks, and magnetic tapes.

Some example embodiments disclosed herein may be implemented using processing circuitry. For example, some example embodiments disclosed herein may be implemented using at least one software program running on at least one hardware device and performing network management functions to control the elements.

The disclosure enhances security prevent attacks like replay attacks, SNDL attacks, and Rogue base station attacks in the wireless communication system. Further, the disclosure enables generation and sharing of ephemeral keys via both secure and insecure channel mechanisms for authentication and encryption procedures in 6G and beyond wireless communication system. More specifically, the disclosure provides perfect forward secrecy guarantee by generating ephemeral keys at the HN and sharing the generated keys to the UE via the secure and in-secure channels so that each session between the UE and the HN can be secured via different key.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal for dynamic data encryption in a communication system, the method comprising:

receiving, from a network entity, a list of network public keys including a plurality of network public keys and corresponding key indexes;

updating previously stored network public keys with the list of network public keys;

generating a pair of keys including a user equipment (UE) public key and a UE private key in response to receiving the list of network public keys;

selecting, for each of a plurality of sessions, a network public key from the list of network public keys received from the network entity;

generating a shared secret key corresponding to the terminal by using the selected network public key and the UE private key;

encrypting data to be transferred between the terminal and the network entity by using the generated shared secret key corresponding to the terminal; and transmitting, to the network entity, the UE public key and a key index corresponding to the selected network public key for enabling the network entity to generate a shared secret key corresponding to the network entity using the UE public key and the key index corresponding to the selected network public key.

2. The method of claim 1, wherein the list of network public keys is received over one of a secured communication channel or an unsecured communication channel.

3. The method of claim 2, wherein the receiving of the list of network public keys from the network entity over the secured communication channel comprises:

establishing a radio resource control (RRC) channel with the network entity; and receiving, from the network entity, the list of network public keys using at least one of a registration accept message, an N1 message, and an RRC connection message.

4. The method of claim 2, wherein the receiving of the list of network public keys from the network entity over the unsecured communication channel comprises:

receiving, from the network entity, the list of network public keys signed with a digital signature using a network private key.

5. The method of claim 1, wherein the data to be transferred between the UE and the network entity corresponds to a subscription permanent identifier (SUPI).

6. The method of claim 1, wherein the list of network public keys corresponds to a list of temporary public keys of a network provided during subscriber identity module (SIM) provisioning.

7. A method performed by a network entity for dynamic data encryption in a communication system, the method comprising:

transmitting, to a terminal, a list of network public keys including a plurality of network public keys and corresponding key indexes;

receiving, from the terminal, a user equipment (UE) public key and a key index corresponding to a network public key selected from the transmitted list of network public keys for each of a plurality of sessions, in response to the transmitted list of network public keys;

generating a shared secret key corresponding to the network entity using the UE public key and the key index corresponding to the network public key; and encrypting data to be transferred between the terminal and the network entity by using the generated shared secret key corresponding to the network entity.

8. The method of claim 7, wherein the list of network public keys is transmitted over one of a secured communication channel or an unsecured communication channel.

9. The method of claim 8, wherein the transmitting of the list of network public keys over the secured communication channel comprises:

establishing a radio resource control (RRC) channel with the terminal; and transmitting, to the terminal, the list of network public keys using at least one of a registration accept message, an N1 message, and an RRC connection message.

10. A terminal, comprising:

a transceiver;

memory storing one or more computer programs; and one or more processors communicatively coupled to the transceiver and the memory, wherein the one or more computer programs include computer-executable instructions that, when executed by the one or more processors individually or collectively, cause the terminal to:

receive, from a network entity via the transceiver, a list of network public keys including a plurality of network public keys and corresponding key indexes, update previously stored network public keys with the list of network public keys, generate a pair of keys including a user equipment (UE) public key and a UE private key in response to receiving the list of network public keys, select, for each of a plurality of sessions, a network public key from the list of network public keys received from the network entity, generate a shared secret key corresponding to the terminal by using the selected network public key and the UE private key, encrypt data to be transferred between the terminal and the network entity by using the generated shared secret key corresponding to the terminal, and transmit, to the network entity via the transceiver, the UE public key and a key index corresponding to the selected network public key for enabling the network entity to generate a shared secret key corresponding to the network entity using the UE public key and the key index corresponding to the selected network public key.

11. The terminal of claim 10, wherein the list of network public keys is received over one of a secured communication channel or an unsecured communication channel.

12. The terminal of claim 11, wherein the one or more computer programs further include computer-executable instructions that, when executed by the one or more processors, cause the terminal to:

establish a radio resource control (RRC) channel with the network entity; and receive, from the network entity, the list of network public keys using at least one of a registration accept message, an N1 message, and an RRC connection message.

13. The terminal of claim 11, wherein the one or more computer programs further include computer-executable instructions that, when executed by the one or more processors, cause the terminal to:

receive, from the network entity via the transceiver, the list of network public keys signed with a digital signature using a network private key.

14. The terminal of claim 10, wherein the data to be transferred between the UE and the network entity corresponds to a subscription permanent identifier (SUPI).

15. The terminal of claim 10, wherein the list of network public keys corresponds to a list of temporary public keys of a network provided during subscriber identity module (SIM) provisioning.

16. A network entity, comprising:

a transceiver;

memory storing one or more computer programs; and one or more processors communicatively coupled to the transceiver and the memory, wherein the one or more computer programs include computer-executable instructions that, when executed by the one or more processors, cause the network entity to:

transmit, to a terminal via the transceiver, a list of network public keys including a plurality of network public keys and corresponding key indexes, receive, from the terminal via the transceiver, a user equipment (UE) public key and a key index corresponding to a network public key selected from the transmitted list of network public keys for each of a plurality of sessions, in response to the transmitted list of network public keys, generate a shared secret key corresponding to the network entity using the UE public key and the key index corresponding to the network public key, and encrypt data to be transferred between the terminal and the network entity by using the generated shared secret key corresponding to the network entity.

17. The network entity of claim 16, wherein the list of network public keys is transmitted over one of a secured communication channel or an unsecured communication channel.

18. The network entity of claim 17, wherein the one or more computer programs further include computer-executable instructions that, when executed by the one or more processors, cause the network entity to:

establish a radio resource control (RRC) channel with the terminal; and transmit, to the terminal, the list of network public keys using at least one of a registration accept message, an N1 message, and an RRC connection message.

* * * * *